United States Patent
Aastuen et al.

(10) Patent No.: US 12,386,191 B2
(45) Date of Patent: Aug. 12, 2025

(54) OPTICAL FILM AND POLARIZING BEAM SPLITTER

(71) Applicant: 3M INNOVATIVE PROPERTIES COMPANY, St. Paul, MN (US)

(72) Inventors: David J. W. Aastuen, Shoreview, MN (US); Zhisheng Yun, Sammamish, WA (US); Timothy J. Nevitt, Red Wing, MN (US); John D. Le, Woodbury, MN (US); Susan L. Kent, Shorewood, MN (US); Gilles J. Benoit, Minneapolis, MN (US); David T. Yust, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 932 days.

(21) Appl. No.: 17/292,972

(22) PCT Filed: Dec. 4, 2019

(86) PCT No.: PCT/IB2019/060440
§ 371 (c)(1),
(2) Date: May 11, 2021

(87) PCT Pub. No.: WO2020/115679
PCT Pub. Date: Jun. 11, 2020

(65) Prior Publication Data
US 2022/0004015 A1    Jan. 6, 2022

Related U.S. Application Data

(60) Provisional application No. 62/776,561, filed on Dec. 7, 2018.

(51) Int. Cl.
*G02B 27/28* (2006.01)
*G02B 5/28* (2006.01)
*G02B 5/30* (2006.01)

(52) U.S. Cl.
CPC ........... *G02B 27/283* (2013.01); *G02B 5/285* (2013.01); *G02B 5/305* (2013.01)

(58) Field of Classification Search
CPC ...... G02B 27/283; G02B 27/28; G02B 5/285; G02B 5/305; G02B 5/30; G02B 5/3025; G02B 5/3033; G02B 5/3041
See application file for complete search history.

(56) References Cited

U.S. PATENT DOCUMENTS

| | | | |
|---|---|---|---|
| 5,882,774 | A | 3/1999 | Jonza |
| 6,179,948 | B1 | 1/2001 | Merrill |

(Continued)

FOREIGN PATENT DOCUMENTS

| | | |
|---|---|---|
| JP | 2001004840 A | 1/2001 |
| WO | 2008008646 A2 | 1/2008 |

(Continued)

OTHER PUBLICATIONS

Nevitt, "Recent Advances in Multilayer Polymeric Interference Reflector Products", Thin Solid Films, 2013, vol. 532, pp. 106-112, XP055576474.

(Continued)

*Primary Examiner* — Stephone B Allen
*Assistant Examiner* — Adam W Booher
(74) *Attorney, Agent, or Firm* — Clifton F. Richardson

(57) ABSTRACT

An optical film and a polarizing beam splitter (PBS) including the optical film is described. The optical film includes a first optical stack disposed on, and spaced apart by one or more spacer layers from, a second optical stack. When the optical film is disposed between, and adhered to, hypotenuses of first and second prisms to form a PBS and a cone of light is incident on the PBS making an incident angle of about 40 to 50 degrees with the optical film, the PBS has: an average optical reflectance Rs greater than about 95% for a (Continued)

first polarization state; an average optical transmittance Ts less than about 0.012% for the first polarization state; an average optical transmittance Tp less than about 98.5% for a second polarization state; and an average optical reflectance Rp less than about 0.25% for the second polarization state.

9 Claims, 20 Drawing Sheets

(56) References Cited

U.S. PATENT DOCUMENTS

| | | | |
|---|---|---|---|
| 6,411,437 | B1 | 6/2002 | Cannon |
| 6,719,426 | B2 | 4/2004 | Magarill |
| 6,721,096 | B2 | 4/2004 | Bruzzone |
| 6,783,349 | B2 | 8/2004 | Neavin |
| 7,445,341 | B2 | 11/2008 | Conner |
| 7,568,804 | B2 | 8/2009 | Ma |
| 7,826,009 | B2 | 11/2010 | Weber |
| 8,382,293 | B2 | 2/2013 | Phillips, III |
| 9,535,256 | B2 | 1/2017 | Carls |
| 2004/0227994 | A1 | 11/2004 | Ma |
| 2005/0168697 | A1 | 8/2005 | Bruzzone |
| 2007/0047080 | A1 | 3/2007 | Stover |
| 2008/0013051 | A1 | 1/2008 | Glinski |
| 2008/0151371 | A1 | 6/2008 | Weber |
| 2010/0124667 | A1 | 5/2010 | Liu |
| 2011/0272849 | A1 | 11/2011 | Neavin |
| 2012/0249935 | A1 | 10/2012 | Oya |
| 2012/0293742 | A1 | 11/2012 | Banerjee |
| 2014/0287211 | A1 | 9/2014 | Oya |
| 2016/0238762 | A1 | 8/2016 | Nevitt |

FOREIGN PATENT DOCUMENTS

| | | |
|---|---|---|
| WO | 2009123928 A1 | 10/2009 |
| WO | WO 2019-077547 | 4/2019 |
| WO | WO 2019-123141 | 6/2019 |
| WO | WO 2019-162834 | 8/2019 |
| WO | WO 2020-115679 | 6/2020 |

OTHER PUBLICATIONS

Weber, "Giant Birefringent Optics in Multilayer Polymer Mirrors", Science, 2000, vol. 287, pp. 2451-2456, XP000990141.
International Search Report for PCT International Application No. PCT/IB2019/060440, mailed on Jun. 26, 2020, 7 pages.

Transmission Coef for prepolarized input w F2.04 cone, incident on PBS film in BK7 prism cube Transmission Coef for prepolarized input w F2.04 cone, incident on PBS film in BK7 prism cube Transmission Coef for Prepolarized input w F2.04 cone, incident on PBS film in BK7 prism cube Transmission Coef for Prepolarized input w F2.04 cone, incident on PBS film in BK7 prism cube Transmission Coef for Prepolarized input w F2.04 cone, incident on PBS film in BK7 prism cube Transmission Coef for Prepolarized input w F2.04 cone, incident on PBS film in BK7 prism cube

OPTICAL FILM AND POLARIZING BEAM SPLITTER

BACKGROUND

A polarizing beam splitter may include a reflective polarizer disposed between the hypotenuses of adjacent prisms. The reflective polarizer may be a multilayer polymeric film.

SUMMARY

In some aspects of the present description an optical film including a first optical stack disposed on, and spaced apart by one or more spacer layers from, a second optical stack is provided. In some aspects of the present description, a polarizing beam splitter (PBS) including the optical film disposed between first and second prisms is provided. In some embodiments, the one or more space layers include light absorbing elements, such as dichroic dyes, at a sufficient level that when a cone of light is incident on the PBS, the PBS generates substantially no light streak propagating between hypotenuses of the first and second prisms between an incident location on the optical film of the cone of light and a diagonal edge of the PBS.

In some aspects of the present description, an optical film including a first optical stack disposed on, and spaced apart by one or more spacer layers from, a second optical stack is provided. The first and second optical stacks and the one or more spacer layers are formed integrally with one another. Each optical stack includes a plurality of polymeric interference layers reflecting and transmitting light primarily by optical interference in a same predetermined wavelength range extending at least from 450 to 700 nm. For light in the predetermined wavelength range and substantially normally incident on the optical film, the plurality of the interference layers in each optical stack reflects at least 80% of light having a first polarization state and transmits at least 80% of light having an orthogonal second polarization state. When the optical film is disposed between, and adhered to, hypotenuses of first and second prisms to form a polarizing beam splitter (PBS), and a cone of light having at least one wavelength in the predetermined wavelength range and an f-number from about 1.8 to about 2.2 is incident on the PBS making an incident angle of about 40 to 50 degrees with the optical film, the PBS has: an average optical reflectance Rs greater than about 95% for the first polarization state; an average optical transmittance Ts less than about 0.012% for the first polarization state; an average optical transmittance Tp less than about 98.5% for the second polarization state; and an average optical reflectance Rp less than about 0.25% for the second polarization state. Tp/Ts is greater than about 8000. Tp may be greater than about 90%, or greater than about 92%, or greater than about 94%, or greater than about 95%. Tp+Rp may be less than 98.5%, or less than 98%, or less than 97.5%, or less than 97%.

In some aspects of the present description, an optical film substantially reflecting light having a first polarization state and substantially transmitting light having an orthogonal second polarization state in a predetermined wavelength range extending at least from about 450 nm to about 700 nm is provided. The optical film includes opposing first and second major surfaces and first and second optical stacks disposed therebetween and separated by a spacer. The first optical stack is disposed closer to the first major surface and farther from the second major surface and the second optical stack is disposed closer to the second major surface and farther from the first major surface. The first and second optical stacks and the spacer layer are formed integrally with one another. For each optical stack and the major surface closest to the optical stack: the optical stack includes a plurality of alternating polymeric first and second layers numbering between 50 and 300 in total; each first and second layer has an average thickness less than about 400 nm; in planes of the first and second layers, the first and second layers have respective indices of refraction: n1x and n2x along the first polarization state, n1y and n2y along the second polarization state, and n1z and n2z along a z-axis orthogonal to the first and second polarization states, such that at a wavelength of about 550 nm: a difference between n1x and n2x is greater than about 0.2; a difference between n1x and each of n1y and n1z is greater than about 0.2; and a maximum difference between n2x, n2y and n2z is less than about 0.01. For normally incident light in the predetermined wavelength range, the optical film has an average optical absorption of greater than about 1%. The difference between n1x and n2x may be greater than about or 0.22, or greater than about 0.24. The difference between n1x and each of n1y and n1z may be greater than about 0.22, or greater than about 0.24, or greater than about 0.25. The average optical absorption may be greater than about 1.5%, or greater than about 2%, or greater than about 2.5%.

In some aspects of the present description, a polarizing beam splitter (PBS) including a first prism having a first hypotenuse; a second prism having a second hypotenuse facing the first hypotenuse; and an optical film disposed between and adhered to the first and second hypotenuses is provided. The optical film includes first and second optical stacks separated by a spacer layer having a thickness greater than about 1 micron. Each optical stack includes a plurality of alternating higher index and lower index polymeric layers. The optical film substantially reflects light having a first polarization state and substantially transmits light having an orthogonal second polarization state in a predetermined wavelength range extending at least from 450 nm to 700 nm. When a cone of light having the first polarization state and an f-number between about 1.8 to about 2.2 is incident on the PBS making an incident angle of about 40 to 50 degrees with the optical film at an incident location on the optical film, the PBS generates substantially no light streak propagating along and between the first and second hypotenuses between the incident location and a diagonal edge of the PBS.

DETAILED DESCRIPTION

Figure 1A:
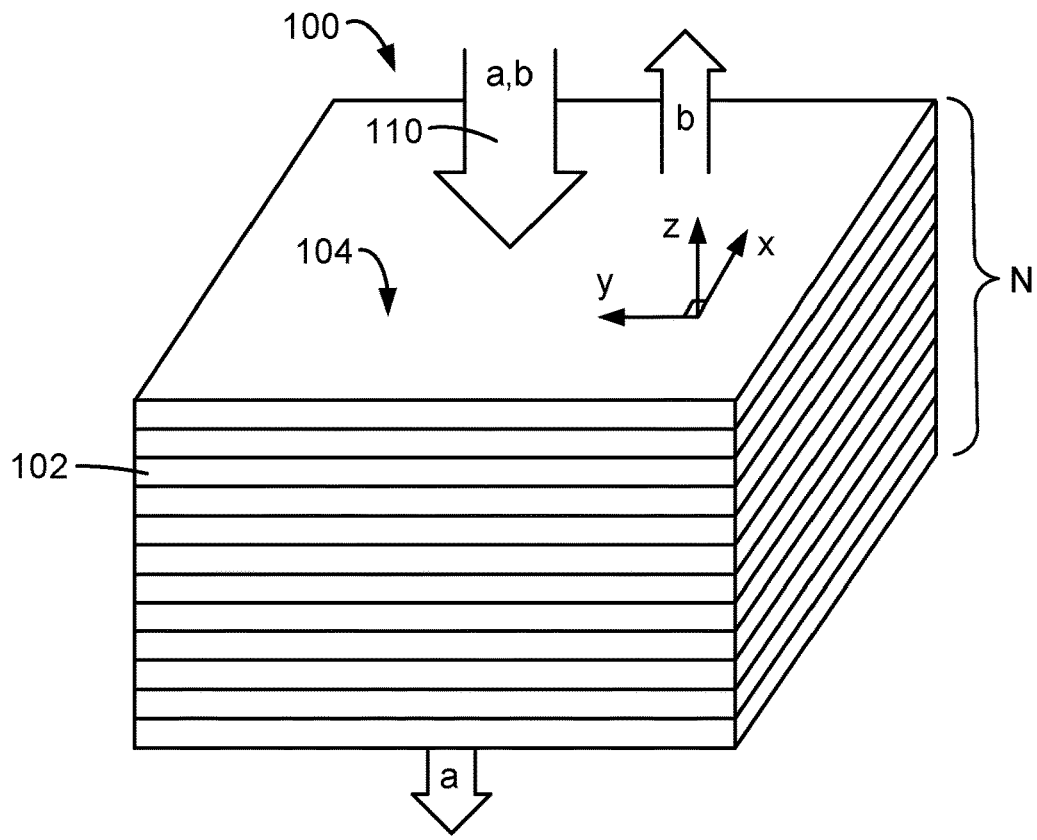
FIG. 1A is a schematic perspective view of a multilayer optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, optical films are provided which have improved optical properties over conventional films. In some embodiments, the optical films are reflective polarizer films suitable for use in a polarizing beam splitter which is suitable for use in various optical systems including head-mounted virtual reality or augmented reality displays. In some embodiments, the optical films, or optical stacks included in the optical films, have a high reflectivity (e.g., at least 80%, 85%, 90%, 92%, 94%, 95%, 96%, or 97%) over a predetermined wavelength range (e.g., 450 to 700 nm, or 400 to 700 nm, or in a range from 400 to 700, or 750, or 800, or 850, or 900, or 950, or 980, or 1000, or 1050 nm) for substantially normally incident light having a first polarization state. In some cases, a higher long wavelength band edge (e.g., at least 950 nm, or at least 980 nm, or at least 1000 nm, or at least 1050 nm) is desired for improved performance when the film is used in a polarizing beam splitter. In some embodiments, the optical films include two (or more) optical stacks of alternating first and second layers with the thicker layers of the first optical closer to the thicker layers of the second optical stack and the thinner layers of the first optical stack farther from the thinner layers of the second packet. It has been found that such optical films can simultaneously provide a high-quality image reflection and a very low transmission leak (e.g., a transmission in the block state of less than about 0.05%, or less than about 0.01%). In some embodiments, a spacer between the two optical stacks includes light absorbing elements and/or is or includes a dichroic polarizer (light absorbing linear polarizer). It has been found that this can reduce image contamination from multiple reflections between the two packets and/or can mitigate effects of de-polarizing scattering within the optical film. It has further been found that without the dichroic polarizer or absorbing dyes in the spacer, or with too weak a dichroic polarizer or too low a concentration of dyes, a polarizing beam splitter (PBS) including the optical film between two prisms can exhibit a light streak propagating along and between the hypotenuses of the prisms between a light incidence location and a diagonal edge of the PBS. It has been found that a sufficient amount of dye, for example, can be included in the spacer to eliminate or substantially eliminate this light streak while a high transmittance in the predetermined for substantially normally incident light having a second polarization state orthogonal to the first polarization state is maintained.

Figure 1B:
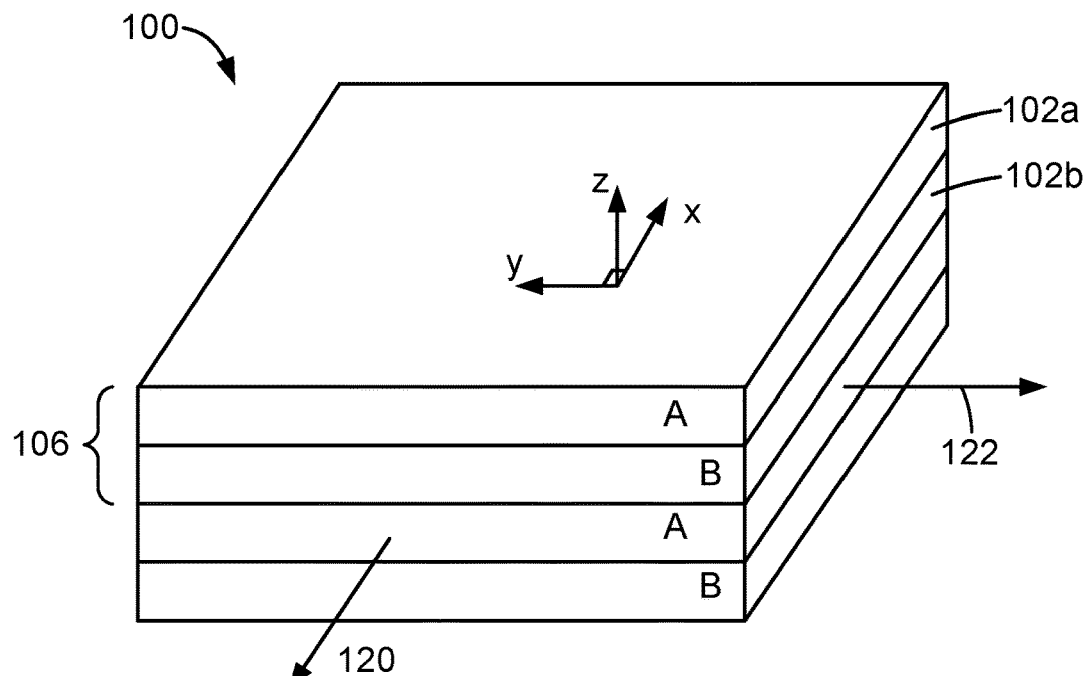
FIG. 1B is a schematic perspective view of a portion of the multilayer optical film of FIG. 1A.

The optical films described herein may be characterized as a multilayer optical film having plurality of optical layers (e.g., interference layers) configured to selectively transmit and reflect light within a predetermined wavelength range. In some such embodiments, the optical films function as a reflective polarizer that selectively transmits and reflects light of different polarization states. For example, FIG. 1A is a schematic perspective view of an example of a multi-layer optical film 100 that includes a plurality of interference layers 102 positioned along a central axis to form optical film 100 having a total of (N) interference layers 102. FIG. 1B is a schematic perspective diagram of a segment of the optical film 100 illustrating alternating interference layers 102a and 102b. FIGS. 1A-1B include a coordinate system that defines x, y, and z directions.

During use, light incident on a major surface of optical film 100 (e.g., film surface 104), depicted by incident light 110, may enter a first layer of optical film 100 and propagate through the plurality of interference layers 102, undergoing select reflection or transmission by optical interference depending on the polarization state of incident light 110. Incident light 110 may include a first polarization state (b) and a second polarization state (a) that are be mutually orthogonal to one another. The second polarization state (a) may be considered as the "pass" state while the first polarization state (b) may be considered as the "reflected" or "block" state. As incident light 110 propagates through plurality of interference layers 102, portions of the light in the first polarization state (b) will be reflected by adjacent interference layers resulting in the first polarization state (b) being reflected by optical film 100, while a portion of the light in the second polarization state (a) collectively passes through optical film 100.

In some embodiments, the optical film 100 may be characterized in terms of its reflectivity and transmissivity of the first and second polarization states (b) and (a) of incident light 110. For example, the amount of incident light 110 for a predetermined wavelength transmitted through optical film 100 may be expressed as the percent of optical transmittance (Tb) for the first polarization state (b) and the percent of optical transmittance (Ta) for the second polarization state (a). The amount of incident light 110 for a predetermined wavelength range reflected by optical film 100 may be expressed as the percent of optical reflectance (Rb) for the first polarization state (b) and the percent of optical reflectance (Ra) for the second polarization state (a). For a given optical film, the sum of transmissivity, reflectivity, and losses due to absorption, will amount to 100% for light within a predetermined wavelength range.

The predetermined wavelength range may be any suitable wavelength range, including for example, visible light (e.g., about 400-700 nm), a range of visible light (e.g., about 400 nm, or about 420 nm, or about 430 nm, or about 450 nm or about 480 nm to about 600 nm, or about 630 nm, or about 635 nm, or about 650 nm, or about 680 nm, or about 700 nm), near-infrared (e.g., about 800-1300 nm), a range based on the output of a light source such as a liquid crystal display backlight (e.g., 425-675 nm), and a range based on providing a desired bandwidth at off normal incidence (e.g., 400 nm or 450 nm to 750 nm, or 800 nm, or 850 nm, or 900 nm, or 950 nm, or 980 nm, or 1000 nm, or 1050 nm). In some embodiments, optical film 100 may be configured to transmit and reflect light of different polarizations states within more than one predetermined wavelength range, e.g., visible light and near-infrared. For example, the predetermined wavelength range may include a first range from about 430 nm to about 465 nm, a second range from about 490 nm to about 555 nm, and a third range from about 600 nm to about 665 nm. In some embodiments, optical film 100 may include multiple stack/packets, as described further elsewhere herein, that each include a plurality of interference layers, where each stack/packet may be directed to a different predetermined wavelength range or may be directed to a same predetermined wavelength range. In some preferred embodiments, each stack/packet is configured to reflect a substantially same predetermined wavelength range.

In some embodiments, the interference layers may be characterized as a series of two-layer unit cells or optical repeat units. The thickness of each unit cell may be configured to reflect a target wavelength within the predetermined wavelength range. In some examples, the central wavelength of reflectivity for a unit cell corresponds to the twice the optical thickness of a two-layer unit cell. Therefore, to reflect a predetermined wavelength range (e.g. 450 to 700 nm), the unit cells within the stacks/packets will have different thicknesses to cover wavelengths from the left band-edge to the right band-edge. The optical thickness of a layer refers to the index of refraction of the layer times the physical thickness of the layer. In the case of an optical film configured to reflect light polarized along a block axis and transmit light polarized along an orthogonal pass axis, the index of refraction used in determining the optical thickness is the index of refraction along the block axis. The two layers in the optical repeat units may have equal or approximately equal optical thicknesses. In some cases, it is useful to characterize the optical repeat unit in terms of an "f-ratio" which is the optical thickness of the higher index layer in the pair of layers divided by the total optical thickness of the layer pair. In some embodiments, the f-ratio is about 0.5. An f-ratio of 0.5 may be preferable since this maximizes the reflective power of the 1st order (primary) reflection band of an optical stack or packet of interference layers.

In some embodiments, optical film 100 includes less than about 1200 (N) interference layers 102, where each interference layer 102 reflects or transmits incident light 110 primarily by optical interference. In some embodiments, optical film 100 includes less than about 1000, or less than about 800, or less than about 600, or less than about 300 interference layers 102. While 1200 or more interference layers 102 may be included in optical film 100, in some cases, it may be desirable to achieve the desired optical performance using fewer total layers in order to reduce the overall thickness of the film, since reducing the overall thickness of a display assembly (e.g., LCD displays) is preferable in many applications. Additionally or alternatively, the fewer total number of interference layers 102 may reduce the complexity in of the manufacturing process as well as reduce the potential for introducing variability (e.g., spectral variability in block or pass states) or production errors (e.g., increased block state transmission due to depolarization between the layers, reduced pass state transmission) in the final optical film. In some embodiments, the total number N of interference layers 102 is greater than about 50, or greater than about 100, or greater than about 150, or greater than about 200.

Interference layers may be described as reflecting and transmitting light primarily by optical interference when the reflectance and transmittance of the interference layers can be reasonably described by optical interference or reasonably accurately modeled as resulting from optical interference. Adjacent pairs of interference layers having differing refractive indices reflect light by optical interference when the pair has a combined optical thickness (refractive index along the block axis times physical thickness) of ½ the wavelength of the light. Interference layers typically have a physical thickness of less than about 400 nanometers, or less than about 300 nanometers, or less than about 200 nanometers. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 2 micrometers, or at least 3 micrometers, or at least 4 micrometers, or at least 5 micrometers.

In some embodiments, the optical film 100, or an optical stack included in the optical film 100, has an average optical transmittance (Ta) greater than about 80% for a second polarization state (a), an average optical reflectance (Rb) greater than about 80% for an orthogonal first polarization state (b), and an average optical transmittance (Tb) less than about 5% for the first polarization state (b) for a substantially normally incident light 110 in a predetermined wavelength range. In some embodiments, Ta is greater than about 80%, or greater than about 85%, or greater than about 87% or greater than about 89%. In some embodiments, Rb is greater than about 90%, or greater than about 95%, or greater than about 96%, or greater than about 97%, or greater than about 98%. In some embodiments, Tb is less than about 5%, or less than about 4%, or less than about 3%, or less than about 2%, or less than about 1%, or less than about 0.5%, or less than about 0.3%, or less than about 0.2%, or less than about 0.1%, or less than about 0.05%, or less than about 0.04%, or less than about 0.03%, or less than about 0.02%, or less than about 0.01%. In some embodiments, a desired Ta, Tb and Rb is achieved using greater than about 50, or greater than about 100 and less than about 1200, or less than about 600 or less than about 300 total interference layers 102 in the optical film 100 or in an optical stack included in the optical film 100. A high Rb (e.g., greater than about 95%) and a low Tb (e.g., less than about 5%) with a relatively small number of layers can be achieved by choosing materials for the interference layers and controlling the stretch ratios of the film so that the refractive index difference between adjacent interference layers for light having the second polarization state is small (e.g., less than about 0.01, or less than about 0.008) and the refractive index difference between adjacent interference layers for light with the first polarization state is large (e.g., greater than about 0.2). The refractive index or index of refraction can be taken to be the index at a wavelength of 550 nm if no wavelength is specified.

The transmittance of an optical film refers generally to the transmitted light intensity divided by the incident light intensity (for light of a given wavelength, incident direction, etc.), but may be expressed in terms of "external transmittance" or "internal transmittance". The external transmittance of an optical film is the transmittance of the optical film when immersed in air, and without making any corrections for Fresnel reflections at the air/element interface at the front of the element or for Fresnel reflections at the element/air interface at the back of the element. The internal transmittance of an optical film is the transmittance of the film when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmittance relative to the internal transmittance. If transmittance is referred to herein without being specified as internal or external, it may be assumed that the transmittance refers to external transmittance, unless otherwise indicated by the context.

The reflectance and transmittance of an optical film when used between two prisms in a polarizing beam splitter (PBS), for example, may be expressed in terms of the total reflectance and total transmittance, respectively, of the optical film as used in the PBS. The total transmittance is the transmitted power in a given wavelength divided by the incident power within the prism in which the light at the given wavelength is incident. Similarly, the total reflectance is the reflected power in a given wavelength divided by the incident power within the prism in which the light at the given wavelength is incident.

The reflectance and transmittance of a PBS including an optical film between two prisms, for example, may be expressed in terms of the total reflectance and total transmittance, respectively, of the PBS. The total transmittance is the transmitted power in a given wavelength divided by the power incident on the PBS of the light at the given wavelength. Similarly, the total reflectance is the reflected power in a given wavelength divided by the power incident on the PBS of the light at the given wavelength. The reflected power includes the power of any light reflected by Fresnel reflections. The total absorbance can be determined as 100% minus the sum of the total transmittance and the total reflectance.

In some embodiments, interference layers 102 of optical film 100 includes alternating layers (e.g., A and B depicted in FIG. 1B) of two different polymeric materials that exhibit differing index of refraction characteristics. As shown in FIG. 1B, optical film 100 includes of alternating layers (e.g., ABABA . . . ) of different optical materials referred to as material "(A)" and material "(B)". As described further elsewhere herein, the various layers of the two different materials may be formed through an extrusion/lamination process in which the layers are extruded together to form the multiple optical layers 102 (ABABA . . . ) that are adhered together.

In some embodiments, during the extrusion process the optical layers 102 may be stretched to impart the various interference characteristics of the film. For example, layers of the A and B optical material may be stretched (e.g., in a 5:1 ratio or a 6:1 ratio) along one axis (e.g., the X-axis), and not stretched appreciably along the orthogonal axis (e.g., the Y-axis). The indices of refraction along the X, Y and Z axes are denoted nx, ny, nz, respectively, for either the A or B layers. The indices of refraction may also be denoted as n1x, n1y, n1z and n2x, n2y, n2z for the A and B layers, respectively, along the along the X, Y and Z axes, respectively.

The selection of optical material used to form the A and B layers may be selected to impart specific optical characteristics to the film as a result of the stretching process. For example, the (B) material forming optical layers 102b may have a nominal index of refraction (e.g., n2 between 1.5 and 1.6) which is not substantially altered by the stretching process. As such, the index of refraction for "B" layers 102b in both the x and y directions (n2x and n2y) may be substantially the same for both directions after the stretching process and may be substantially the same as the index of refraction in the thickness direction (n2z). For example, in some embodiments, a maximum difference between n2x, n2y and n2z is less than about 0.01. In contrast, the (A) material forming optical layers 102a may have an index of refraction altered by the stretching process. For example, a uniaxially stretched layer 102a of the (A) material may have a higher index of refraction in the X-axis or stretched direction 120 (e.g., $1.8 \leq n1x \leq 1.9$), and a different index of refraction associated with the Y-axis or non-stretched direction 122 (e.g., $1.5 \leq n1y \leq 1.6$) which may substantially equal the index of refraction in the thickness direction (e.g., $1.5 \leq n1z \leq 1.6$). In some embodiments, an absolute value of a difference between n1y and n1z is less than 0.008 and a difference between n1x and n1y is greater than about 0.2. Due to the increased index of refraction in the stretched direction, layers 102a including material (A) may be considered as the high index of refraction (HIR) layers 102a (also referred to as higher index polymeric layers) while interference layers 102b including material (B) may be considered as the low index of refraction (LIR) layers 102b (also referred to as lower index polymeric layers). In some embodiments, an absolute value of a difference between n2y and n2z is less than 0.005. In some embodiments, each of n2x, n2y and n2z is between 1.5 and 1.6. In some embodiments, the refractive indices of the alternating AB layers may be may be controlled by judicious materials selection and processing conditions. In some embodiments, the optical characteristics of the layers 102 causes optical film 100 to act as a reflecting polarizer that will substantially transmit the second polarization state (a) component of incident light 110 within a predetermined wavelength range oriented with respect to the non-stretched axis 122, while the stretched axis 120, will correspond to the reflect-axis for which the component of incident light 110 in first polarization state (b) within the predetermined wavelength range will be substantially reflected through optical interference.

Figure 20:
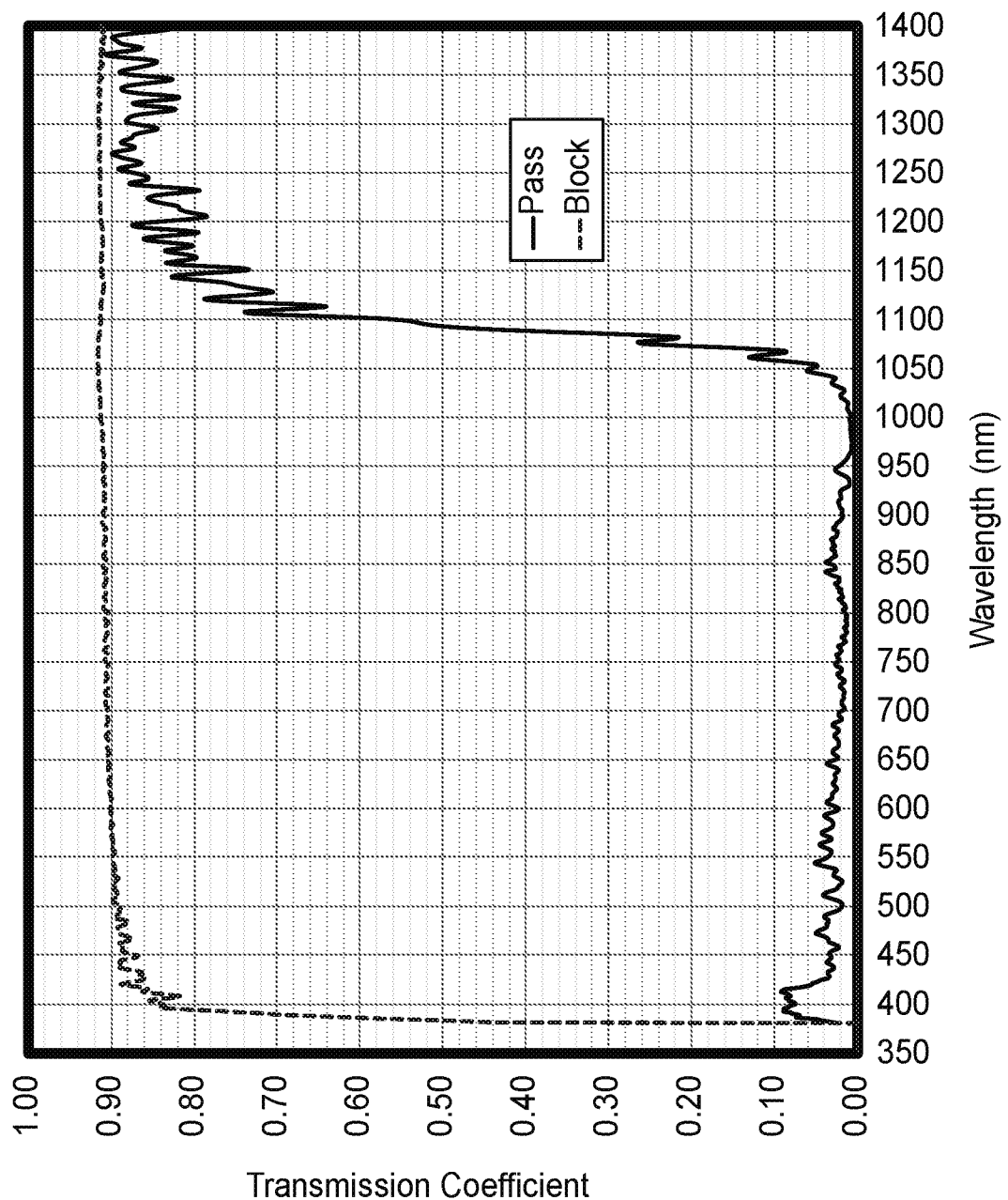
FIGS. 20-21 are plots of transmission coefficients for reflective polarizer films.
Figure 21:
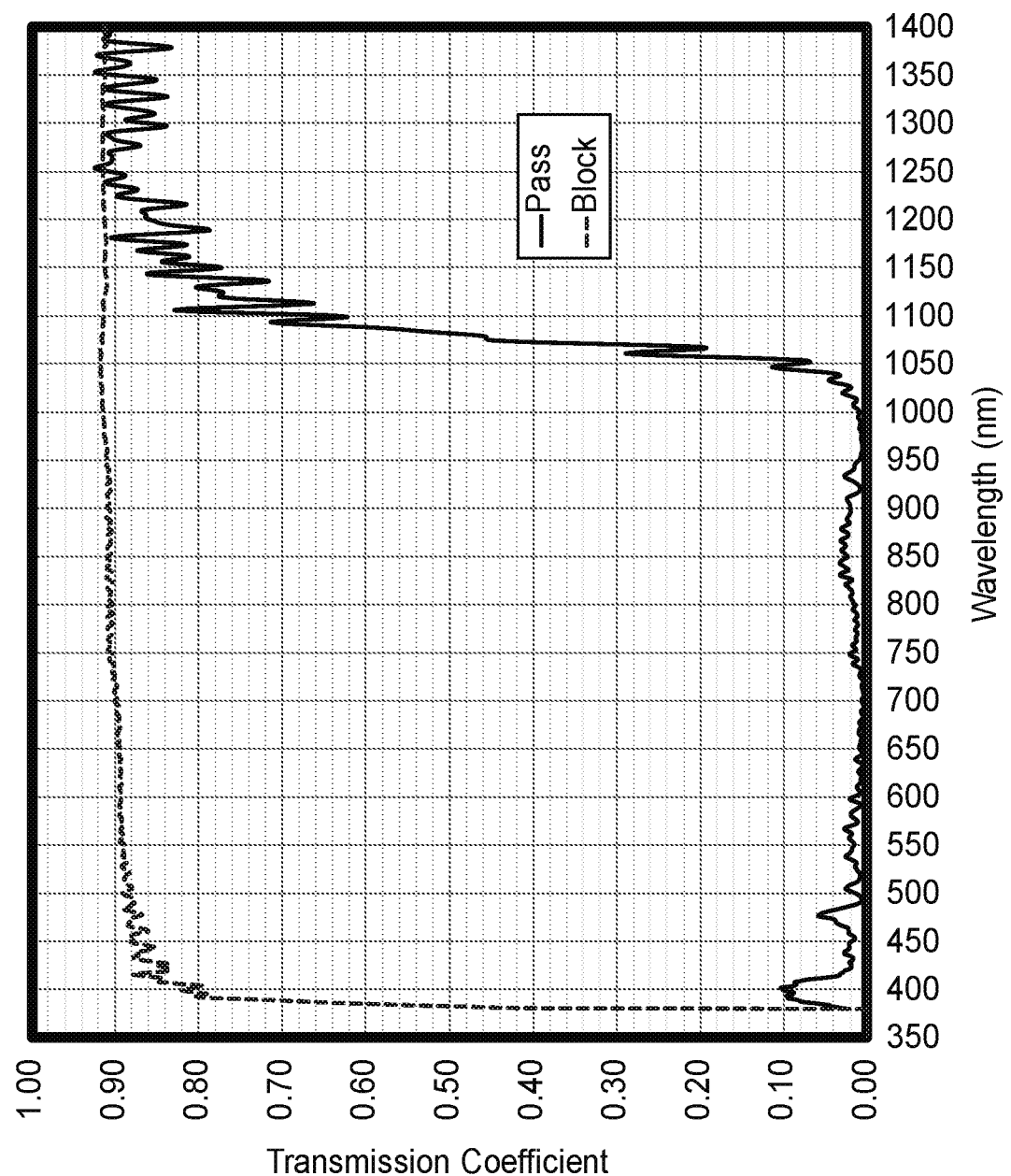

In some embodiments, optical film 100 may be characterized by the difference between the indices of refraction between alternating HIR layers 102a and LIR layers 102b along the stretched axis 120 (i.e., $\Delta nx = n1x - n2x$). In some such embodiments, the indices of refraction between alternating HIR layers 102a and LIR layers 102b along the non-stretched axis direction 122 may be substantially the same such that the difference between the indices in non-stretched axis direction 122 (i.e., $\Delta ny = n1y - n2y$) is about 0.0 (e.g., $|\Delta ny|$ less than about 0.02, or less than about 0.01, or less than about 0.005). In some examples, increasing the $\Delta nx$ between HIR and LIR layers 102a, 102b (e.g., via choice of materials and/or control of the uniaxial orientation of the film) may permit sufficient transmission/reflection of polarized light for a given wavelength range using a fewer total number of interference layers as compared to an optical film with a lower Δnx for with the same optical power. For example, each packet of the reflective polarizer film of Example 1 contained 276 interference layers (138 optical repeat units) and each packet had an average optical transmittance greater than 85% for normally incident light in air in the pass state, and an average optical reflectance greater than 95% and an average optical transmittance less than 5% for normally incident light in air in the bock state where the averages were over the wavelength range from about 400 nm or about 450 nm to about 700 nm, or about 750 nm, or about 800 nm, or about 850 nm, or about 900 nm, or about 950, or about 980 nm, or about 1000 nm or about 1050 nm. (The data shown in FIGS. 20-21 are for two-packet polarizers, but since most of the reflection is due to the packet facing the incident light, similar results hold for a reflective polarizer having only one of the two packets). Thus, a suitable reflectance and transmittance was obtained with a similar number of layers as some conventional reflective polarizer films but over a significantly larger bandwidth.

In some embodiments, in planes of the first and second layers 102a and 102b, the first and second layers 102a and 102b have respective indices of refraction: n1x and n2x along the first polarization state, n1y and n2y along the second polarization state, and n1z and n2z along a z-axis orthogonal to the first and second polarization states. In some embodiments, at a wavelength of about 550 nm (e.g., at a wavelength of 532 nm and/or at a wavelength in a range of 500 nm to 600 nm): a difference between n1x and n2x is greater than about 0.2, or greater than about 0.22, or greater than about 0.24; a difference between n1x and each of n1y and n1z is greater than about 0.2, or greater than about 0.22, or greater than about 0.24, or greater than about 0.25; and a maximum difference between n2x, n2y and n2z is less than about 0.01.

Preferably, the stretched axis direction of each of interference layers 102 will be substantially aligned (e.g., aligned or nearly aligned) such that the X-axis for each respective layer 102 represents the direction for obtaining the maximum index of refraction within the X-Y plane for each layer. However due to machine tolerances and number of interference layers 102, the stretched axis 120 for each of the interference layers (e.g., representing the direction of obtaining the maximum index or refraction for the layer) may be aligned to within a variance of about ±2°.

In some embodiments, optical film 100, or an optical stack included in optical film 100, may include a total of no less than 50 or no less than 100 and no more than 600 (N) or no more than 300 (N) first layers 102a and second layers 102b that reflect or transmit light primarily by optical interference. In some embodiments, for each pair of adjacent first and second layers 102a, 102b, the layers may define a stretched axis that represents the direction in which the maximum index of refraction obtained for the respective layer (e.g., X-axis/direction 120 corresponding to indices of refraction n1x and n2x for the two layers). The difference of indices of refraction between the first layer 102a and second layer 102b for the primary axis (e.g., Δnx=n1x−n2x) may be greater than about 0.2, or greater than about 0.22, or greater than about 0.24. In some such embodiments, the respective stretched axis directions for each of first and second optical layers 102a, 102b may be substantially aligned such that interference layers 102 define a maximum angular range of the respective stretched-axis directions of less than about 2 degrees.

Optical film 100 including the plurality of interference layers 102 may be formed using any suitable technique. General techniques for forming multilayer optical films are described in U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783, 349 (Neavin et al.) "Apparatus for Making Multilayer Optical Films", and patent application publication US 2011/0272849 (Neavin et al.) "Feedblock for Manufacturing Multilayer Polymeric Films". For example, layers 102a and 102b including optical materials A and B respectively may be fabricated using coextruding, casting, and orienting processes to form stacks/packets of tens to hundreds of interference layers 102, followed stretching or otherwise orienting the extruded layers to form a stack/packet of interference layers 102. Each stack/packet may include between about 50 and 1000 total interference layers (e.g., each optical stack may include a plurality alternating polymeric first and second layers numbering between 50 and 300 in total) depending on the desired characteristics of optical film 100. Each stack/packet of the optical film 100 is typically a continuous set of alternating interference layers 102a, 102b that is absent of any spacer or non-interference layers formed within the stack/packet (e.g., sequentially arranged). In some embodiments, spacer, non-interference layers, or other layers may be added to the outside of a given stack/packet, thereby forming the outer layers of the film without disrupting the alternating pattern of interference layers 102 within the stack/packet.

In some embodiments, optical film 100 may be fabricated by coextrusion followed by drawing or stretching. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (where the film is allowed to dimensionally relax in the in-plane direction perpendicular to the stretch direction) or "constrained" (where the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the various layers are preferably chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

Example (A) materials suitable for optical film 100 may include, for example, polyethylene naphthalate (PEN), copolymers containing PEN and polyesters (e.g., polyethylene terephthalate (PET) or dibenzoic acid), glycol modified polyethylene terephthalate. Example (B) materials suitable for optical film 100 may include, for example, copolyesters based on PEN, copolyesters based on PET, polycarbonate (PC), or blends of these three classes of materials. To achieve high reflectivities with a reasonable number of layers, adjacent microlayers can exhibit a difference in refractive index (Δnx) for light polarized along the x-axis of at least 0.2, for example.

While optical film 100 may be described in some embodiments as having greater than or equal to 50 or greater than or equal to 100 and less than or equal to 600 or less than or equal to 300 total (N) interference layers 102 (e.g., each of two optical stacks in the optical film 100 may include between 50 and 300 interferences layers 102 in total), it will be appreciated that the lower bound of the total number of layers (N) may be any suitable amount configured to obtain the described optical properties. In some embodiments, there may be a trade-off between the obtained optical properties and the total number of layers (N)/thickness of the resultant film. For example, while in some embodiments the contrast ratio (Ta/Tb) of a film may generally increase by increasing the total number of interference layers 102 included in optical film 100 absent any manufacturing complications as discussed prior, the thickness of the film will also increase with the increasing number of layers. In some embodiments, such as in modern thin optical display devices, the overall thickness of a film may be a limiting factor as the availability for space in such optical display units is limited. In some embodiments, optical film 100 may provide a significant increase in one or more optical properties (e.g., contrast ratio), while having a significantly reduced film thickness (e.g., half) compared to other film constructions (e.g., the combined absorptions polarizer and reflective polarized used in some conventional display units). In addition, excessive thickness of the film may carry the risk of decreasing the overall contrast ratio due to depolarization of the pass-state light propagating through the film.

In some embodiments, optical film 100 may have between about 100 and about 600 total interference layers 102 with an overall thickness for optical film 100 of less than about 100 μm including any optional non-interference or protective layers. In some embodiments, optical film 100 has a total thickness of less than about 100 μm (e.g., less than 80 μm or in a range of 50 μm to 80 μm) across all of the layers of optical film 100.

In some embodiments, the thickness of the individual interference layers 102 may be relatively thin such that fewer than 30% of interference layers 102 have a thickness greater than about 200 nm (e.g., less than 5% of interference layers 102 have a thickness greater than 200 nm or all interference layers 102 have a thickness less than about 200 nm), but may vary as function of position within optical film 100. In some embodiments, each interference layer 102 has an average thickness less than about 400 nm, or less than about 300 nm, or less than about 200 nm. In some examples, optical film 100 may be characterized in terms of the film's thickness profile. For example, the thickness of the individual interference layers 102 may vary such that the thickness of the individual interference layers 102 generally increases (e.g., increasing thickens apart from local fluctuations) moving from an outermost interference layer to an interference layer near a center of the optical film 100.

Figure 2:
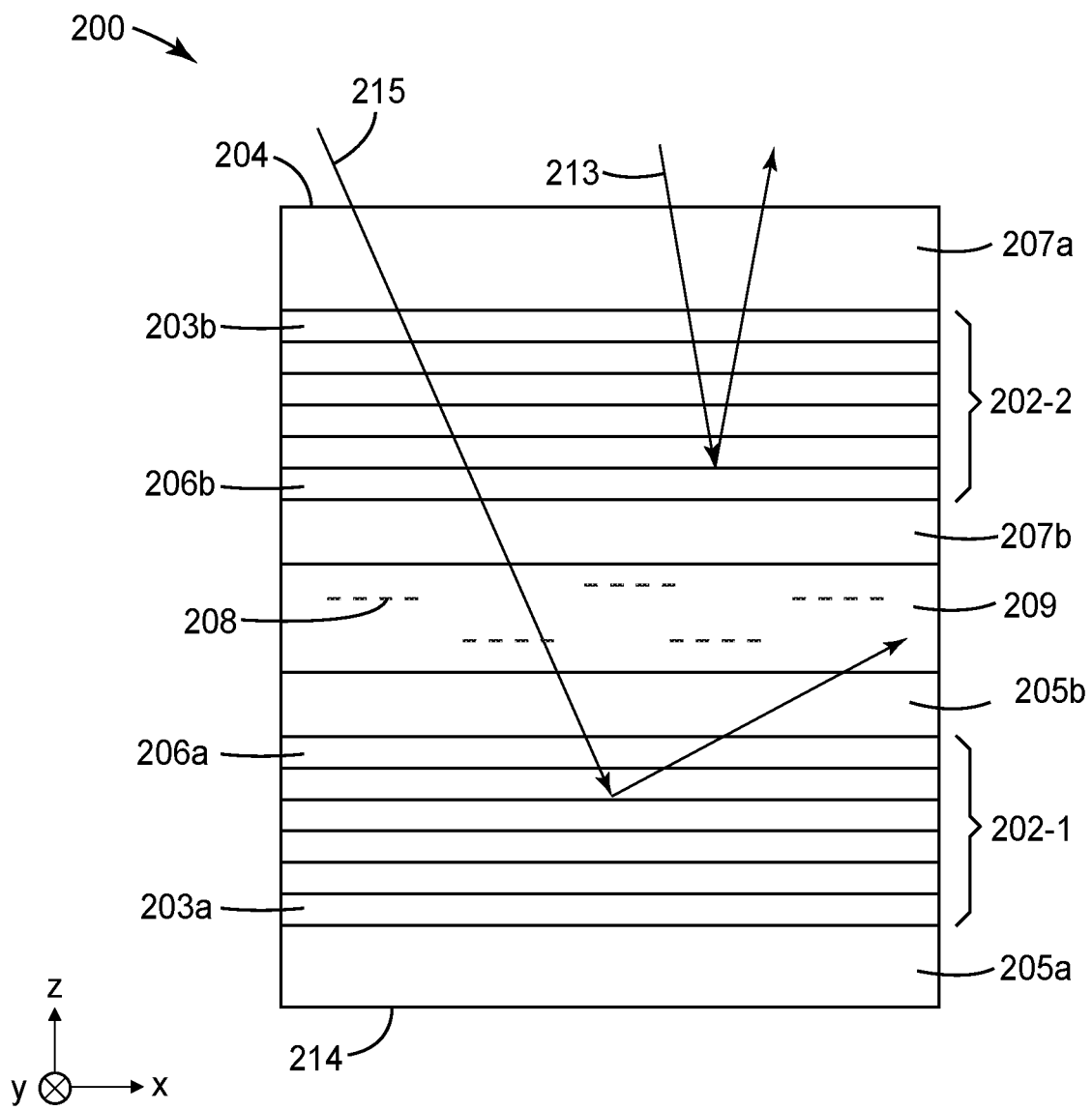
FIG. 2 is a schematic side view of an optical film which includes first and second optical stacks.

In some embodiments, an optical film includes more than one optical stack or packet of interference layers. FIG. 2 is a schematic side view of optical film 200 which includes first optical stack 202-1 and second optical stack 202-2 disposed between opposing first and second major surfaces 214 and 204 of the optical film 200. Each of the first and second optical stacks 202-1 and 202-2 include a plurality of interference layers and may be as described for the plurality of interference layers 102. The number of interference layers included in optical film 200 may be significantly larger than schematically illustrated in FIG. 2 and may be in any of the ranges described elsewhere herein. The first and second optical stacks 202-1 and 202-2 are non-overlapping in that they do not share any layers and not layers of one optical stack are interspersed with layers of the other optical stack. First and second protective boundary layers (PBLs) 205a and 205b are included at opposite sides of the first optical stack 202-1, and first and second protective boundary layers 207a and 207b are included at opposite sides of the second optical stack 202-2. In the illustrated embodiment, the PBLs 205a and 207a are outermost layers of the optical film 200. An intermediate layer 209 is included between PBLs 205b and 207b. The intermediate layer 209 together with the PBLs 205b and 207b may be described as spacer layers between the first and second optical stacks 202-1 and 202-2. Alternatively, the first and second optical stacks 202-1 and 202-2 may be described as including their respective PBLs, and the intermediate layer 209 may be described as a spacer layer. In some embodiments, each of the PBLs 205a, 205b, 207a and 207b are optically thick (i.e., a thickness substantially larger than a wavelength in the predetermined wavelength range). In some embodiments, an optically thick layer has a thickness greater than about 1 micrometer, or greater than 2 times a largest wavelength in the predetermined wavelength range, or greater than 3 times a largest wavelength in the predetermined wavelength range. In some embodiments, the intermediate layer 209 is optically thick.

In some embodiments, the optical film 200 includes one or more spacer layers (e.g., intermediate layer 209 and the PBLs 205b and 207b) where a thickness of at least one spacer layer (e.g., layer 209) in the one or more spacer layers is greater than about 1 micron, or 2 microns, or 3 microns, or 4 microns, or 5 microns. In some embodiments, a thickness of the at least one spacer layer is less than about 50 microns, or 40 microns, or 30 microns, or 20 microns, or 10 microns. For example, in some embodiments, a thickness of the at least one spacer layer is in a range from about 1 micron or about 2 microns to about 40 microns or to about 30 microns.

In some embodiments, the intermediate layer 209 is a spacer layer including light absorbing elements 208. Light absorbing elements 208 may include light absorbing dye(s) or pigment(s) or a combination of light absorbing dye(s) and pigment(s), for example. In some embodiments, the light absorbing elements 208 include a light absorbing dye, such as a light absorbing dichroic dye. In some embodiments, the spacer layer includes the light absorbing elements 208 and a concentration of at least 4, or 5, or 6 weight percent.

In some embodiments, the intermediate layer 209 is a light absorbing linear polarizer. In some embodiments, the light absorbing linear polarizer has a block axis substantially aligned (e.g., within 5 degrees, or within 2 degrees) with each of the block axes (second polarization state) of the first and second optical stacks 202-1 and 202-2. In some embodiments, the intermediate layer 209 is or includes a dichroic polarizer transmitting at least 80% of light having the second polarization state and absorbing at least 20%, or at least 30%, or at least 40%, or at least 50%, or at least 60%, or at least 70%, or at least 80% of light having the first polarization state. In some embodiments, for light in the predetermined wavelength range and substantially normally incident on the dichroic polarizer, the dichroic polarizer has an average transmittance of at least 80% of light having the second polarization state and an average optical absorption of at least 20% (e.g., from 20% or 30% to 80%, or 70%, or 60%, or 50%, or 45%) of light having the first polarization state.

In some embodiments, optical film 200 is made by forming a melt stream including each layer of the optical film 200 which dichroic dyes in the intermediate layer 209, then casting the melt stream onto a chill roll, and then substantially uniaxially orienting the cast film. The high index layers of the first and second optical stacks 202-1 and 202-2 and the dichroic dyes in the intermediate layer may consequently be oriented along substantially the same direction.

In some embodiments, for normally incident light in the predetermined wavelength range, the optical film 200 has an average optical absorption (unweighted average (mean) over polarization states and over wavelengths in the predetermined wavelength range) of greater than about 1%, or 1.5%, or 2%, or 2.5%. For example, the optical film 200 may have an optical absorption in the pass state of about 3% and an optical absorption averaged over polarization states of about 1.5% since the incident light in the block state is substantially reflected without reaching an optically absorbing spacer layer. In some embodiments, for normally incident light in the predetermined wavelength range, the optical film 200 has an average optical absorption of less than about 20%, or 15%, or 12%, or 10%.

Figure 24:
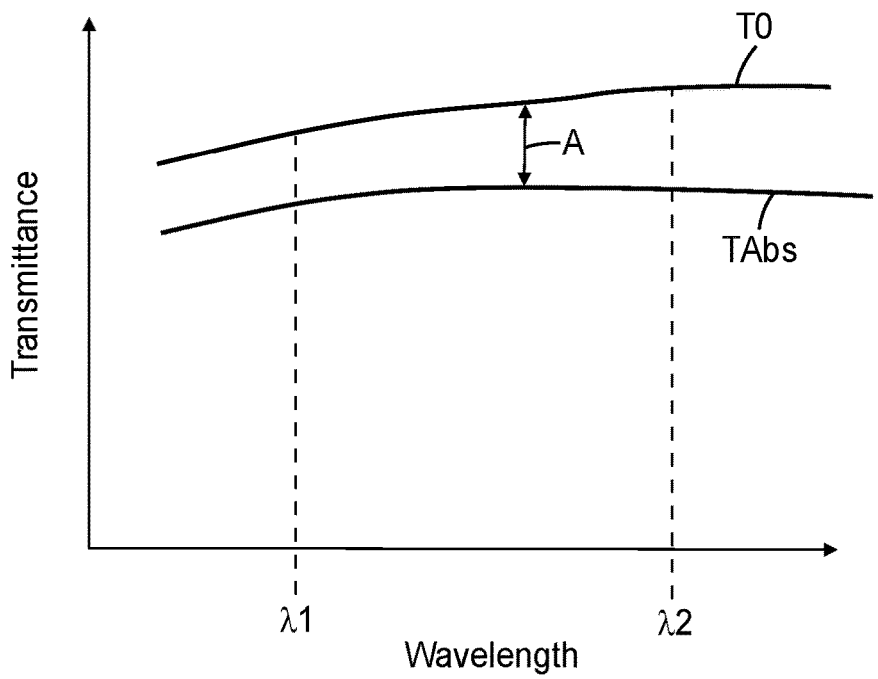
FIG. 24 is a schematic plot of transmittance versus wavelength for an optical film or a layer.

FIG. 24 is a schematic plot of transmittance versus wavelength for an optical film or a layer (e.g., a spacer layer or a dichroic polarizer layer). The transmittance for the optical film or layer not including light absorbing elements (e.g., light absorbing dyes) is denoted T0 and the transmittance for the optical film or layer including light absorbing elements is denoted TAbs. The average difference between T0 and TAbs is the average optical Absorbance A. In some embodiments, the schematically illustrated transmittance is for the optical film for unpolarized normally incident light and the average optical absorbance A is greater than about 1%, or 1.5%, or 2%, or 2.5% and less than about 20%, or 15%, or 12%, or 10%. In some embodiments, the schematically illustrated transmittance is for a spacer layer for normally incident light polarized along the block axis and the average optical absorbance A is greater than about 20% and less than about 45% (e.g., no more than 46% or 47%), for example.

In some embodiments, the first and second optical stacks 202-1 and 202-2 and the spacer layer 209 or the one or more spacer layers (e.g., layer 209 and optionally layers 205b and 207b) are formed integrally with one another. In some embodiments, the optical film 200 is integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., by casting from a common melt stream and then orienting the cast layers) rather than manufactured separately and then subsequently joined. Integrally formed optical films having more than one packet may be made, for example, by forming melts streams in separate packet creators and merging the packets into a common melt stream, then casting the common melt stream to form a cast film, and then orienting (e.g., by substantially uniaxially stretching) the cast film.

In some embodiments, each of the first and second optical stacks 202-1 and 202-2 includes a plurality of interference layers (e.g., polymeric interference layers) reflecting and transmitting light primarily by optical interference in a same predetermined wavelength range extending at least from 450 to 700 nm (e.g., 400 nm to 980 nm), or at least from 400 to 700 nm, or at least from 400 to 980 nm, or at least from 400 to 700, or 750, or 800, or 850, or 900, or 950, or 980, or 1000, or 1050 nm.

In some embodiments, optical film 200 reflects at least 80%, or at least 90%, or at least 95% of normally incident light having a first polarization state in a predetermined wavelength range and transmits at least 80% of normally incident light having an orthogonal second polarization state in the predetermined wavelength range. The optical film 200 may include a plurality of alternating polymeric first and second layers (the interference layers of the first and second optical stacks 202-1 and 202-2) where each first and second layer has an average thickness less than about 400 nm, or less than about 300 nm, or less than about 200 nm. The plurality of polymeric layers may include first and second polymeric layers 203a and 203b as the two polymeric layers in the plurality of polymeric layers farthest apart from each other. The first and second layers 203a and 203b have respective first and second thicknesses (e.g., thicknesses $t_1$ and $t_n$ depicted in FIG. 3). In some embodiments, an absolute value of a difference between the first and second thicknesses is less than about 20 nm, or less than about 10 nm, or less than about 8 nm, or less than about 7 nm.

In some embodiments, thickest polymeric interference layers of the first and second optical stacks (which may be layers 206a and 206b, for example) are disposed between thinnest polymeric interference layers of the first and second optical stacks (which may be layers 203a and 203b, for example). In some embodiments, a thickest polymeric interference layer of the second optical stack is thicker than a thickest polymeric interference layer of the first optical stack (e.g., layer 206b may be thicker than layer 206a).

In some embodiments, optical film 200 includes a plurality of stacked first polymeric interference layers (the interference layers of first optical stack 202-1) disposed on a plurality of stacked second interference layers (the interference layers of second optical stack 202-2), each first and second interference layers reflecting or transmitting light primarily by optical interference for at least one wavelength in a same predetermined wavelength range. In some embodiments, an outermost first interference layer (first layer 203a) is the first interference layer farthest from the plurality of stacked second interference layers, an outermost second interference layer (second layer 203b) is the second interference layer farthest from the plurality of stacked first interference layers. In some embodiments, the outermost first and second interference layers have optical thicknesses equal to one quarter of respective first and second wavelengths in the predetermined wavelength range. In some embodiments, a difference between the first and second wavelengths is less than about 80 nm, or less than about 60 nm, or less than about 40 nm, or less than about 30 nm, or less than about 20 nm, or less than about 10 nm. In some embodiments, each of the first and second wavelengths is in a range from about 420 nm to about 480 nm.

In some embodiments, an innermost first interference layer 206a is the first interference layer closest to the plurality of stacked second interference layers, an innermost second interference layer 206b is the second interference layer closest to the plurality of stacked first interference layers, and the innermost first and second interference layers 206a and 206b have optical thicknesses equal to one quarter of respective third and fourth wavelengths in the predetermined wavelength range. In some embodiments, a difference between the third and fourth wavelengths is less than about 120 nm, or less than about 100 nm, or less than about 80 nm, or less than about 60 nm, or less than about 40 nm, or less than about 30 nm, or less than about 20 nm, or less than about 10 nm. In some embodiments, each of the third and fourth wavelengths is in a range from about 600 nm to about 635 nm.

A light ray 213 reflecting from the second optical stack 202-2 is illustrated. Other light rays may pass through second optical stack 202-2 and be reflected by first stack 202-1. Some of the light reflected by first stack 202-1 may be absorbed by intermediate layer 209 and some of this light may be reflected by the second optical stack 202-2 or transmitted through the second optical stack 202-2. In some cases, light will be scattered by at least one of the first and second optical stacks. Scattered light generally propagates in directions other than the specular reflection direction and can result from impurities or defects in the optical film, for example. A light ray 215 at a higher incidence angle passes through the second optical stack 202-2 and is scattered from the first optical stack 202-1 and absorbed by intermediate layer 209. More generally, some light, particularly light at high incidence angles, can be scattered by at least one of the first and second optical stacks 202-1 and 202-2 and the intermediate layer 209 can absorb at least a portion of the scattered light.

A variety of layer thickness profiles can be used in the optical films of the present description. In some embodiments, the optical film includes two optical stacks/packets where each stack/packet has a thickness profile that substantially overlaps so that the two optical stacks/packets reflect a same predetermined wavelength range. In some embodiments, the optical film 200 includes opposing first and second major surfaces 214 and 204 and first and second optical stacks 202-1 and 202-2 disposed therebetween and separated by a spacer 209, where the first optical stack 202-1 is disposed closer to the first major surface 214 and farther from the second major surface 204 and the second optical stack 202-2 is disposed closer to the second major surface 204 and farther from the first major surface 214. In has been found that arranging the optical packets so that the thinner interference layers are closer to an outermost surface of the optical film and the thicker interference layers are further from either outermost surface gives improved optical properties in various applications (e.g., in display applications utilizing a polarizing beam splitter) and are thus typically preferred, though other configurations are possible. The optical films may provide one or more of a higher reflectivity for s-polarized light, a higher transmission of p-polarized light, and a lower transmission of s-polarized light over a wider range of incidence angles compared to conventional reflective polarizer films when used in a polarizing beam splitter in an optical system, for example.

Figure 3:
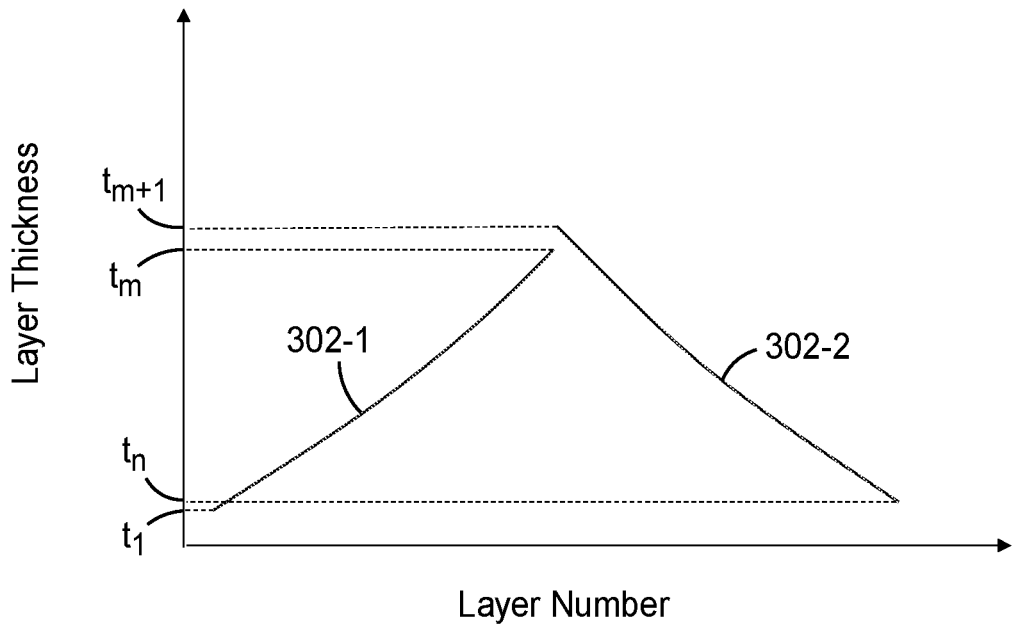
FIG. 3 is a schematic illustration of the layer thickness profile of an optical film.

FIG. 3 is a schematic illustration of the layer thickness profile of an optical film, such as optical film 200, which includes two optical stacks or packets. First optical stack 302-1 includes a plurality of interference layers having thicknesses ranging from $t_1$ at an outermost interference layer of the optical film to $t_m$ at an outermost interference layer of the first optical stack 302-1, which is an interior interference layer of the optical film closest to the second optical stack 302-2. Second optical stack 302-2 includes a plurality of interference layers having thicknesses ranging from $t_{m+1}$ at an outermost interference layer of the second optical stack 302-2, which is an interior interference layer of the optical film closest to the first optical stack 302-1, to $t_n$ at an outermost interference layer of the optical film. In some embodiments, $|t_1-t_n|$ is less than about 20 nm, or less than about 15 nm, or less than about 12 nm, or less than about 10 nm, or less than about 8 nm, or less than about 7 nm, or less than about 6 nm. In some embodiments, $|t_m-t_{m+1}|$ is less than about 40 nm, or less than about 30 nm, or less than about 20 nm, or less than about 15 nm, or less than about 12 nm, or less than about 10 nm. In some embodiments, the interference layers of the first optical stack 302-1 having thicknesses in a range of $t_n$ to $t_m$ and the interference layers of the second optical stack 302-2 having thicknesses in a range of $t_n$ to $t_m$ reflect and transmit light primarily by optical interference over the same predetermined wavelength range extending at least from 450 to 700 nm.

In some embodiments, an optical film includes a plurality of polymeric layers, each polymeric layer having an average thickness less than about 400 nm, or 300 nm, or 200 nm, the plurality of polymeric layers including first and second polymeric layers as the two polymeric layers in the plurality of polymeric layers farthest apart from each other (e.g., layers 203a and 203b), where the first and second layers having respective first and second thicknesses $t_1$ and $t_n$, and a difference between the first and second thicknesses (differences between thicknesses being defined herein as non-negative) is less than about 20 nm or is in any of the ranges described for $|t_1-t_n|$. In some embodiments, the optical film includes first and second optical stacks spaced apart by one or more spacer layers, where the first optical stack includes a first plurality of layers in the plurality of polymeric layers, the second optical stack includes a second plurality of layers in the plurality of polymeric layers, the first optical stack includes the first polymeric layer, and the second optical stack includes the second polymeric layer. In some embodiments, the optical film includes a third polymeric layer in first plurality of layers (e.g., layer 206a in the first optical stack 202-1) and a fourth polymeric layer in the second plurality of layers (e.g., layer 206b in the second optical stack 202-2) as the two polymeric layers in the respective first and second pluralities of layers that are closest to each other, where the third and fourth layers have respective third and fourth thicknesses, and a difference between the third and fourth thicknesses is less than about 40 nm or is in any of the ranges described for $|t_m-t_{m+1}|$.

The optical films of the present description can be used in a variety of applications. For example, the optical films can be used in place of the reflective polarizer customarily used in display applications. In some embodiments, an optical film of the present description is incorporated into a polarizing beam splitter (PBS).

Figure 4:
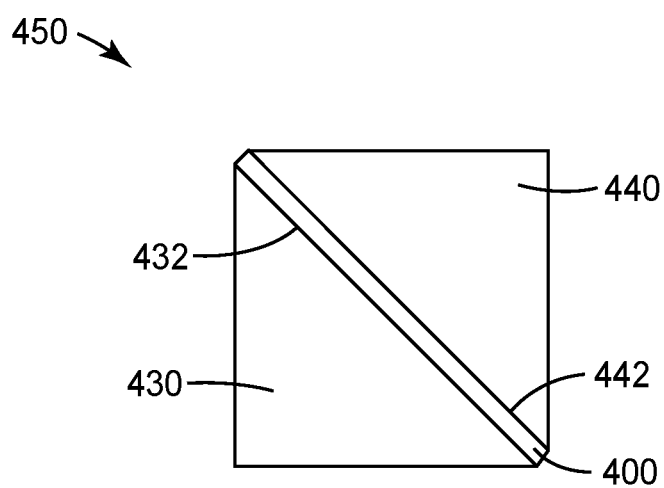
FIGS. 4-5 are schematic side views of polarizing beam splitters.

FIG. 4 is a schematic side view of a polarizing beam splitter (PBS) 450 including a first prism 430 and a second prism 440. First prism 430 includes a first hypotenuse 432 and second prism 440 includes a second hypotenuse 442. An optical film 400 is disposed between and adhered to the first and second hypotenuses 432 and 442. The optical film 400 may be adhered to the first and second hypotenuses 432 and 442 through respective optically clear adhesive layers (not illustrated in FIG. 4). The optical film 400 may be any of the optical films described herein. For example, optical film 400 may correspond to optical film 100 or 200 and may include a plurality of alternating higher index and lower index layers disposed between opposing first and second major surfaces of the optical film. In some embodiments, the optical film 400 corresponds to the optical film 200 with the first optical stack 202-1 closer to the first hypotenuse 432 and farther from the second hypotenuse 442, and the second optical stack 202-2 closer to the second hypotenuse 442 and farther from the first hypotenuse 432. In this case, layer 203a is the interference layer closest to the first hypotenuse 432 and layer 203b is the interference layer closest to the second hypotenuse 442.

The prism may have cross-sections that are right isoceles triangles as schematically illustrated in FIG. 4 or may have other cross-sections. For example, one of the sides of the prism may be curved or the cross-section may be a non-isoceles triangle. The prisms may have a length (into the page) about the same as the lateral dimensions or substantially different from the lateral dimensions. For example, the length may be substantially larger than the lateral dimensions so that the prism is substantially rod shaped. The rod may subsequently be singulated into multiple prisms which may be substantially cubic prisms.

Figure 5:
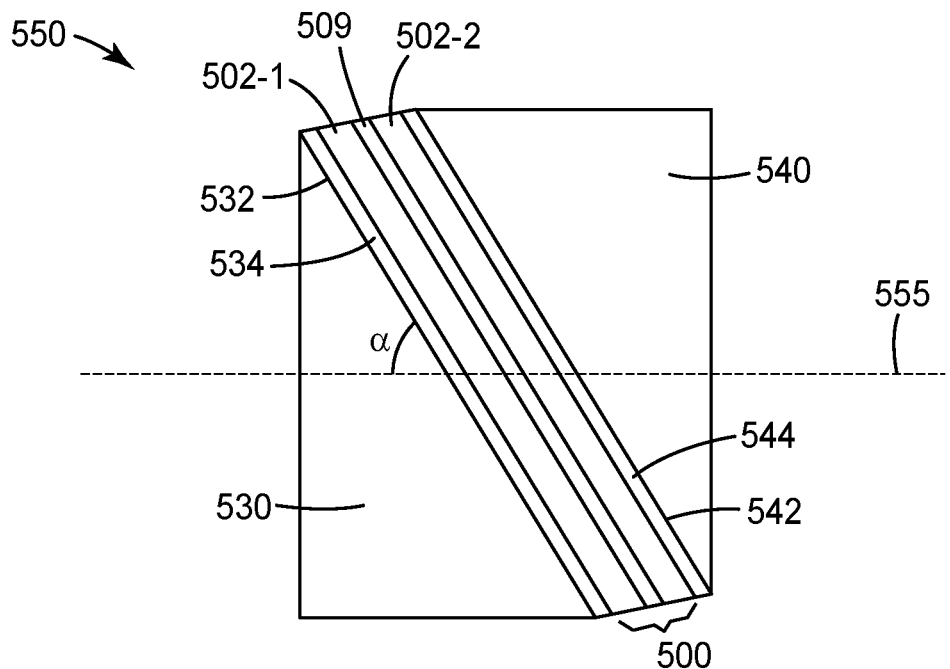

FIG. 5 is a schematic side view of a polarizing beam splitter (PBS) 550 which is in many ways similar to PBS 450. PBS 550 includes a first prism 530 having a first hypotenuse 532, and a second prism 540 having a second hypotenuse 542 which faces the first hypotenuse 532. An optical film 500 is disposed between and adhered to the first and second hypotenuses 532 and 542 through first and second optically clear adhesive layers 534 and 544, respectively. The optical film 500 includes a first optical stack 502-1 disposed on, and spaced apart by a light absorbing linear polarizer 509 from, a second optical stack 502-2. The first optical stack 502-1 is closer to the first hypotenuse 532 and farther from the second hypotenuse 542, and the second optical stack 502-2 is closer to the second hypotenuse 542 and farther from the first hypotenuse 534. In some embodiments, for each optical stack and the hypotenuse closest to the optical stack: the optical stack includes a plurality of interference layers numbering between 50 and 300 in total and reflecting and transmitting light primarily by optical interference in a same predetermined wavelength range extending at least from 400 nm to 600 nm (for example, from 400 nm to 600 nm or from 400 nm to 700 nm), or extending at least from 450 nm to 600 nm, or extending at least from 450 nm to 700 nm, or extending at least from 400 nm or 450 nm to 950 nm or to 980 nm (e.g., from 400 nm to 980 nm or from 450 nm to 1050 nm). In some embodiments, for each optical stack and the hypotenuse closest to the optical stack: the interference layers closer to the hypotenuse are configured to primarily reflect shorter wavelengths in the predetermined wavelength range and the interference layers farther from the hypotenuse are configured to primarily reflect longer wavelengths in the predetermined wavelength range. For example, the thickness profile of the interference layers in the optical film 500 may appear as in FIG. 3 with thinner layers (which reflect shorter wavelengths) closer to the outer surfaces of the optical film and thicker layers (which reflect longer wavelengths) farther from the outer surfaces of the optical film. In some embodiments, the PBS 550 has an optical axis 555 or is used in an optical system having the optical axis 555. In some embodiments, the optical axis 555 makes an angle α of about 30 to 60 degrees, or about 35 to 55 degrees, or about 40 to 50 degrees with the optical film 500.

The prisms used in the PBSs of the present description can be made from any suitable material. For example, the first and second prisms may, independently, be made from glass (e.g., BK7 glass) or polymeric materials such as polycarbonate or polyacrylate.

The polarizing beam splitters of the present description can be used in a variety of applications. For example, the PBSs may be used in an imaging or display system. The display system may be a head-mounted display such as a virtual reality display or an augmented reality display. The use of a PBS in various display applications is discussed, for example, in U.S. Pat. No. 8,382,293 (Phillips, III et al.), and U.S. Pat. No. 9,535,256 (Carls et al.). The PBSs of the present description can be used in place of the PBS of any of the optical systems described in these references. The PBSs of the present description are particularly advantageously used in optical systems where non-modulated light from a light source is reflected from one side of the optical film and a spatially modulated light from an imager is reflected from an opposite side of the optical film. Illustrative embodiments of such optical systems are illustrated in FIGS. 6-7.

Figure 6:
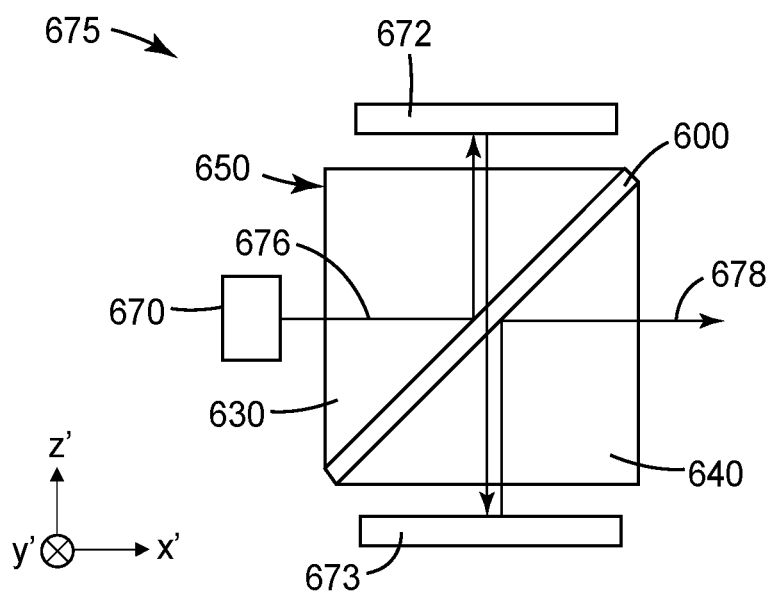
FIGS. 6-8 are schematic cross-sectional views of optical systems.

FIG. 6 is a schematic cross-sectional view of an optical system 675 including a PBS 650, a light source 670, a pixelated spatial light modulator 672, and a reflective component 673. The PBS 650 may be any PBS of the present description and includes an optical film 600 disposed between first and second prisms 630 and 640. The light source 670 produces a light output 676 which is substantially polarized in a block state of the optical film 600. For example, light source 670 may include an unpolarized light source and a linear polarizer disposed to transmit light polarized along the y'-axis, referring to the x', y', z' coordinate system depicted in FIG. 6, which may be the block state of the optical film 600. The pixelated spatial light modulator 672 may be any suitable spatial light modulator. For example, pixelated spatial light modulator 672 may be a liquid crystal on silicon (LCoS) panel with a quarter-wave retarder between the LCoS panel and the PBS 650. The reflective component 673 is preferably a polarization changing reflector. For example, reflective component 673 may include a mirror and a quarter-wave retarder disposed between the mirror and the PBS 650. The light output 676 from the light source 670 is reflected from the optical film 600 and then reflected from the pixelated spatial light modulator 672 as a modulated light 678 having a pass polarization state and which is transmitted through the optical film 600, then reflected from reflective component 673 in the block polarization state, and then reflected from optical film 600. In some embodiments, light 676 is first incident on the optical film 600 in an s-polarization state which is a block polarization state of the optical film 600, then after reflecting from pixelated spatial light modulator 672 is incident on the optical film in a p-polarization state, which is a pass polarization state, and then after reflecting from reflective component 673 is again incident on the optical film 600 in an s-polarization polarization state.

In some embodiments, optical film 600 includes first and second optical stacks and optionally a light absorbing linear polarizer disposed therebetween. In some embodiments, the first optical stack faces the first prism 630 and substantially reflects light output 676 from light source 670, and the second optical stack faces the second prism 640 and substantially reflects light 678 incident on the optical film 600 from the reflective component 673.

Figure 7:
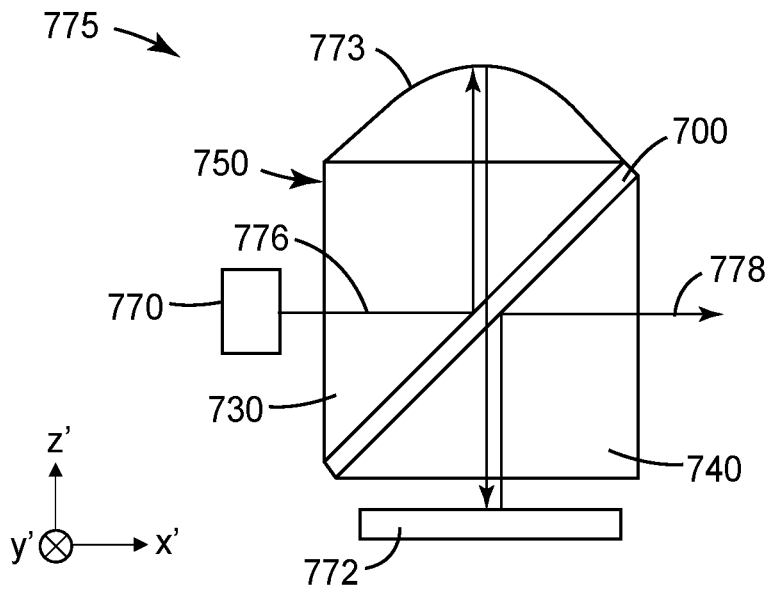

FIG. 7 is a schematic cross-sectional view of an optical system 775 including a PBS 750, a light source 770, a pixelated spatial light modulator 772, and a reflective component 773. The PBS 750 may be any PBS of the present description and includes an optical film 700 disposed between first and second prisms 730 and 740. The light source 770 produces a light output 776 which is substantially polarized in a block state of the optical film 700 and may be as described for light source 670. The pixelated spatial light modulator 772 may be any suitable spatial light modulator and may be as described for pixelated spatial light modulator 672. The reflective component 773 is preferably a polarization changing reflector as described for reflective component 673. In some embodiments, reflective component 773 includes a quarter-wave retarder and a mirror disposed on a surface of a lens which may be bonded to or may be spaced apart from the first prism 730. In other embodiments, the first prism 730 includes a curved outer surface and reflective component 773 is disposed on the curved outer surface of the first prism 730. The light output 776 from the light source 770 is reflected from the optical film 700 and then reflected from reflective component 773 in a pass polarization state, then transmitted through optical film 700, then reflected from the pixelated spatial light modulator 772 as a patterned light 778 having the block polarization state which is then reflected from optical film 700.

Either of the optical systems 675 or 775 may include further components (e.g., magnification optics and/or a waveguide) and may be used in a head-mounted display, for example. Optical system 675 and/or optical system 775 may be described as an imaging system.

In some embodiments, optical film 700 includes a first optical stack disposed on, and spaced apart by a light absorbing linear polarizer from, a second optical stack as described further elsewhere herein. The light output 776 may be referred to as an image light since it can be patterned by the pixelated spatial light modulator 772 to form an image. In some embodiments, the image light enters the PBS, and exits the PBS after being sequentially reflected by the first optical stack, transmitted by the optical film 700, and reflected by the second optical stack, where the light absorbing linear polarizer absorbs at least 50%, or at least 60%, or at least 70%, or at least 80% of image light scattered by at least one of the first and second optical stacks while absorbing less than 2%, or less than 1.5%, or less than 1% of the image light. The pixelated spatial light modulator 772 may be fully on when determining the absorption of the absorbing linear polarizer so that the light output 776 is approximately the image light minus light absorbed by the light absorbing linear polarizer.

Figure 8:
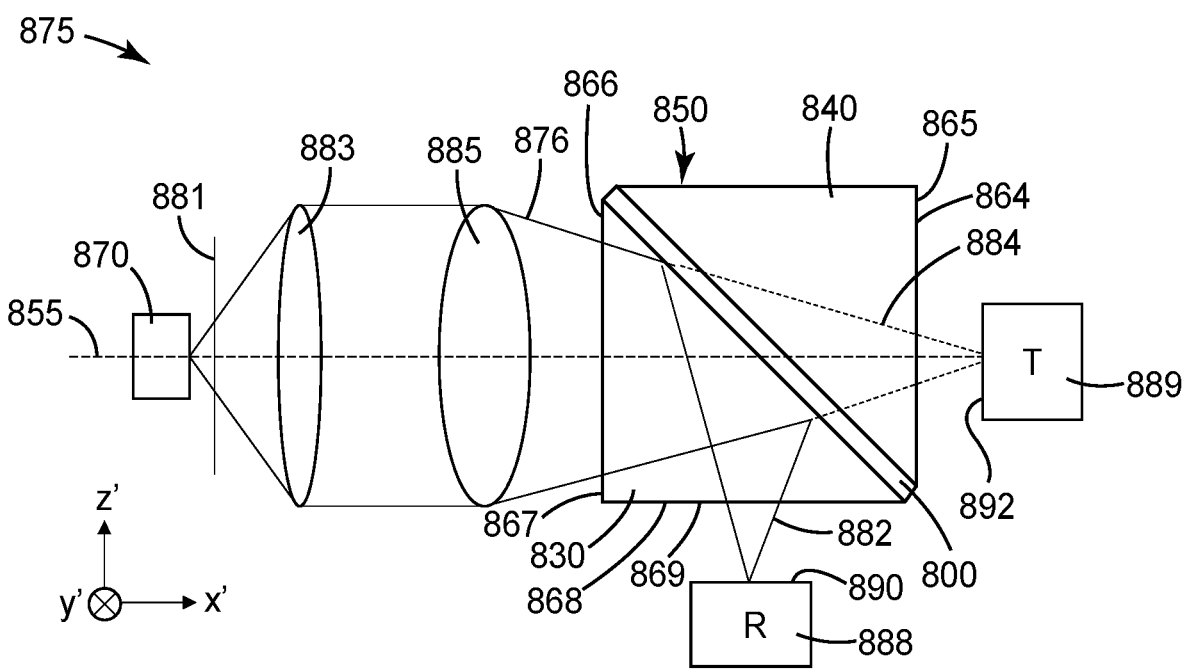

FIG. 8 is a schematic cross-sectional view of an optical system 875 which is useful for determining various properties of the PBSs and optical films described herein. Optical system 875 includes a light source 870, which may be an unpolarized point light source 870, a linear absorbing polarizer 881, a collimating optical lens 883 for collimating light emitted by the point light source 870, an optical lens 885, a PBS 850 including first and second prisms 830 and 840 and an optical film 800 disposed between the first and second prisms 830 and 840 and receiving light 876 from the optical lens 885. The light source 870 may include a light (e.g., a white light) behind a screen with a pinhole (e.g., a hole with a small diameter—for example, 30 micrometers). In some embodiments, a portion 882 of the light 876 is reflected from optical film 800 to a detector 888 which is configured to determine the intensity of this reflected light and thereby determine the reflectance R. In some embodiments, a portion 884 of the light 876 is transmitted through the optical film 800 to a detector 889 which is configured to determine the intensity of this transmitted light and thereby determine the transmittance T. An x', y', z' coordinate system is illustrated in FIG. 8. The linear absorbing polarizer 881 may be oriented to transmit light having an electric field along a specified direction (e.g., along the y'-axis or along the z'-axis) in the y'-z' plane.

In some embodiments, the optical lens 885 is an imaging optical lens. In such embodiments, the optical system 875 may be referred to as an imaging system. In some embodiments, the detector 888 is disposed at an image surface 890 (surface where the optical system forms an image), and similarly, in some embodiments, the detector 889 is disposed at an image surface 892. In some embodiments, the optical lens 885 has an f-number in a range of about 1.8 to about 2.2, or in a range of about 1.9 to 2.1, or the f-number may be nominally 2.0 but may differ from 2.0 (e.g., by less than about 3%, or less than about 2%) due to ordinary manufacturing variations, for example.

Figure 10:
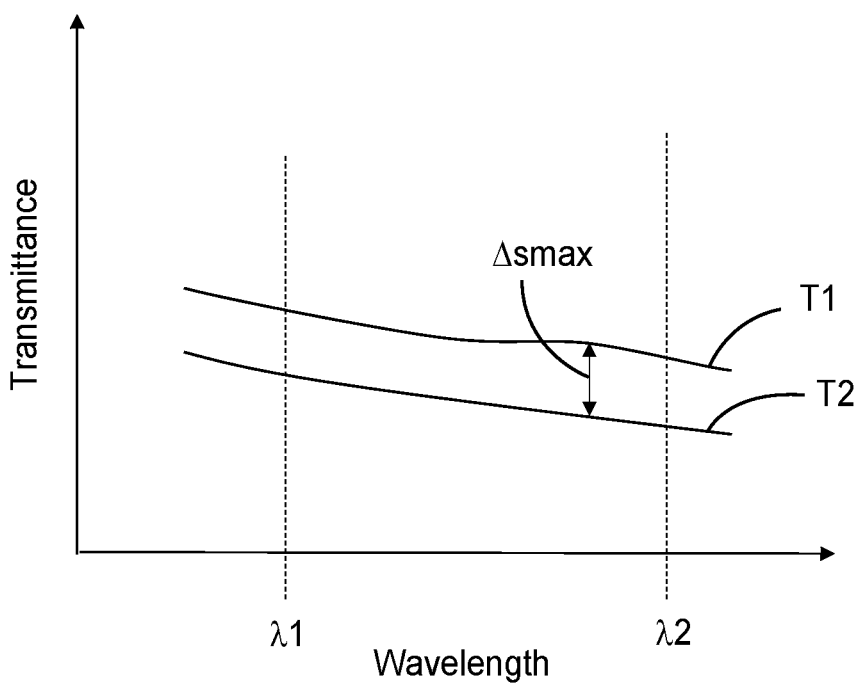
FIG. 10 is a schematic plot of a transmittance of an optical film in a polarizing beam splitter for s-polarized light as a function of wavelength.

In some embodiments, the optical film 800 substantially reflects light having a first polarization state and substantially transmits light having an orthogonal second polarization state in a predetermined wavelength range extending from 450 nm to 700 nm, or at least from 400 nm to 980 nm, for example. Substantially reflecting can be understood to mean a reflectivity of at least 60% and substantially transmitting can be understood to mean a transmittance of at least 60%. The light having the second polarization state may be p-polarized light having the electric field in the z' direction and the light having the first polarization state may be s-polarized light having the electric field in the y' direction. In some embodiments, the polarizer 881 is oriented so that the collimated light from collimating lens 883 has the second polarization state. In some embodiments, optical lens 885 has an f-number in a range of 1.8 to 2.2, or 1.9 to 2.1, or 2.0 to 2.1. In some embodiments, optical lens 885 is centered on optical axis 855 which makes an angle of about 30 to 60 degrees, or about 35 to 55 degrees, or about 40 to 50 degrees with the optical film 800. In some embodiments, the optical film 800 has a total transmittance T=T1 when the light 876 is first incident on the first major surface (facing first prism 830) of the optical film 800. In some embodiments, the PBS 850 is positioned such that second prism 840 is facing optical lens 885 and the optical film 800 has a total transmittance T=T2 when the light 876 is first incident on the second major surface (facing second prism 840) of the optical film 800. A schematic illustration of the transmittance as a function of wavelength when the collimated light from collimating lens 883 has the first polarization state is illustrated in FIG. 10. The predetermined wavelength range is from $\lambda 1$ to $\lambda 2$. In some embodiments, a maximum difference, $\Delta smax$, between T1 and T2 is less than 0.02%, or less than 0.015%, or less than 0.01%, or less than about 0.008%, or less than about 0.006% as a function of a wavelength of the light 876 in the predetermined wavelength range. $\Delta smax$ is the maximum over the predetermined wavelength range of |T1−T2|. For example, a maximum difference between T1 and T2 may occur at a wavelength where T1 is 0.01% (or $10^{-4}$) and T2 is 0.006% so that the maximum difference is 0.004%. In some embodiments, T1 and T2 are each less than about 0.05% (or $5 \times 10^{-4}$), or less than about 0.04%, or less than about 0.03%, or less than about 0.02%, or less than 0.015% for each wavelength in the predetermined wavelength range.

Figure 11:
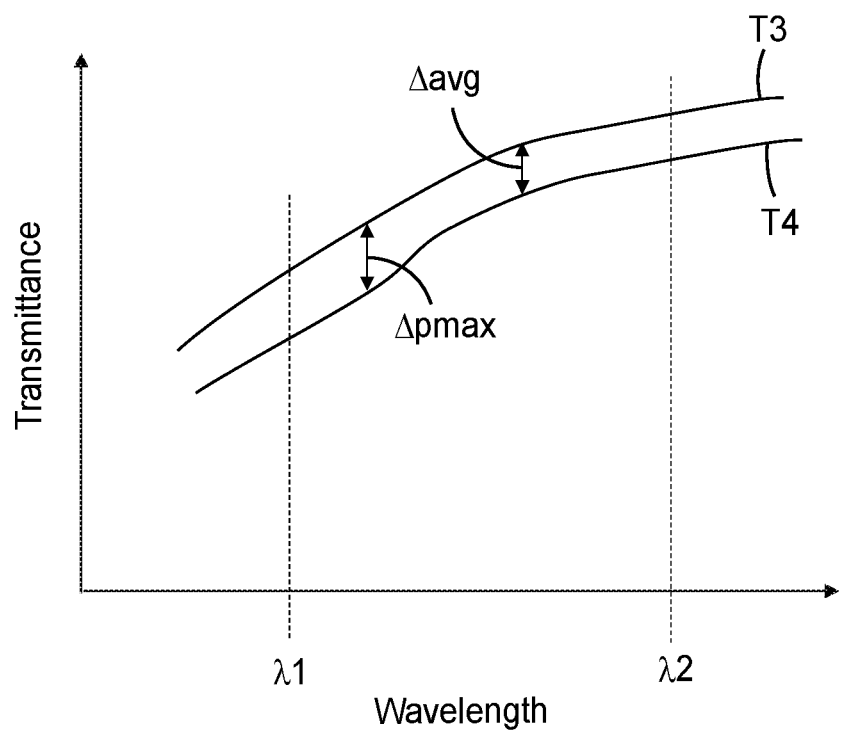
FIG. 11 is a schematic plot of a transmittance of an optical film in a polarizing beam splitter for p-polarized light as a function of wavelength.

In some embodiments, the polarizer 881 is oriented so that the collimated light from collimating lens 883 has the second polarization state. In such embodiments, the optical film 800 may have a total transmittance T=T3 when the light 876 is first incident on the first major surface of the optical film 800 and a total transmittance T=T4 when the light is first incident on the second major surface of the optical film (e.g., when the PBS 850 is positioned such that second prism 840 is facing optical lens 885). A schematic illustration of the transmittance as a function of wavelength when the collimated light from collimating lens 883 has the second polarization state is illustrated in FIG. 11. In some embodiments, an average difference, Δavg, between T3 and T4 is less than 3%, or less than 2%, or less than 1%, or less than 0.5% as a function of the wavelength of the incident light in the predetermined wavelength range. Δavg is the unweighted average over the predetermined wavelength range of |T3−T4|. In some embodiments, a maximum difference, Δpmax, between T3 and T4 is less than 5%, or less than 4%, or less than 3% as a function of a wavelength of the light 876 in the predetermined wavelength range. Δpmax is the maximum over the predetermined wavelength range of |T3−T4|. In some embodiments, an average over the predetermined wavelength range of each of T3 and T4 is at least 92%, or at least 93%, or at least 94%, or at least 95%.

In some embodiments, light 876 is a cone of light having at least one wavelength (e.g., about 550 nm) in the predetermined wavelength range (e.g., extending at least from 450 nm to 700 nm) and an f-number from about 1.8 to about 2.2 (e.g., 1.75, or 2.0, or 2.3) and is incident on the PBS 850 making an incident angle (angle between optical axis 855 and a normal to the optical film 800) of about 40 to 50 degrees (e.g., 38 degrees, or 45 degrees, or 52 degrees) with the optical film 800. In some embodiments, the cone of light is or includes white light. In some embodiments, the cone of light includes wavelengths in a range extending at least from 480 to 600 nm, or at least from 450 to 630 nm, or at least from 430 to 650 nm. In some embodiments, the PBS can be characterized in terms of s-polarization reflectance and transmittance (Rs and Ts) and in terms of p-polarization reflectance and transmittance (Rp and Tp). In some embodiments, the y'-axis is along the block axis of the optical film 800 and the projection of the z'-axis onto the plane of the optical film 800 is along the pass axis of the optical film 800. In such embodiments, s-polarized light is primarily reflected by the optical film 800 to the detector 888 and p-polarized light is primarily transmitted by the optical film 800 to the detector 889.

In some embodiments, an optical film is such that when the optical film is disposed between, and adhered to, hypotenuses of first and second prisms to form a polarizing beam splitter (PBS), and a cone of light having at least one wavelength in the predetermined wavelength range and an f-number from about 1.8 to about 2.2 is incident on the PBS making an incident angle of about 40 to 50 degrees with the optical film, the PBS has: an average optical reflectance Rs greater than about 95% for the first polarization state; an average optical transmittance Ts less than about 0.012% for the first polarization state; an average optical transmittance Tp less than about 98.5% (e.g., less than 98% or less than 99%) for the second polarization state; and an average optical reflectance Rp less than about 0.25% (e.g., less than 0.27% or less than 0.24%) for the second polarization state. The cone of light 876 can be produced using the optical components illustrated in FIG. 8 or can be produced using other optical components known in the art. In some embodiments, Tp/Ts is greater than about 8000, or greater than about 9000, or greater than about 10000. In some embodiments, Tp is greater than about 90%, or greater than about 92%, or greater than about 94%, or greater than about 95%. In some embodiments, Rs is greater than about 96%, or greater than about 97%, or greater than about 98%. In some embodiments, Ts is less than about 0.011%, or less than about 0.01%, or less than about 0.009%. In some embodiments, Rp is less than about 0.22%, or less than about 0.2%, or less than about 0.18%. In some embodiments, Tp+Rp is less than 98.75%, or less than 98.5%, or less than 98%, or less than 97.5%, or less than 97%.

Figure 9:
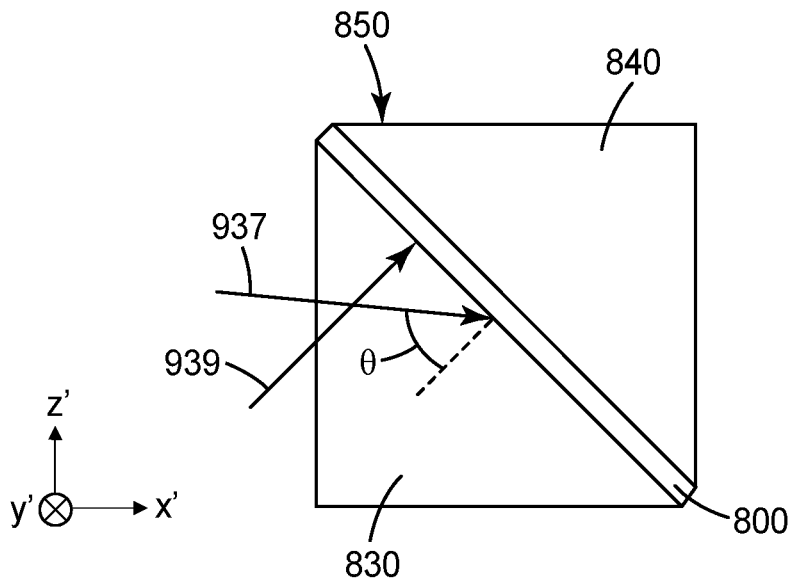
FIG. 9 is a schematic cross-sectional view of a polarizing beam splitter.

The reflectance and transmittance of the optical film 800 or the PBS 850 can also be characterized in terms of reflectance and transmittance of light incident on the optical film 800 in the PBS 850 at specified incident angles. In some embodiments, the reflectance and transmittance of the optical film is nearly flat as a function of wavelength so that a visible wavelength, for example, has a similar reflectance and transmittance at different incident angles. FIG. 9 is a schematic illustration of light 937 and 939 incident on the PBS 850. Light 937 is incident on optical film 800 at an incident angle θ of about 50 degrees and light 939 is incident on optical film 800 at an incident angle of about 0 degrees (about normally incident). In some embodiments, for light (937 or 939) having the first polarization state and incident on the optical film 800 at an incident angle θ, and for at least one wavelength in the predetermined wavelength range, the PBS 850 has average optical reflectance Rs1 and Rs2 for θ about zero and 50 degrees, respectively, and a difference between Rs1 and Rs2 is less than about 5%. The difference between Rs1 and Rs2 refers to |Rs1−Rs2| where Rs1 and Rs2 are expressed as percentages (e.g., Rs1 may be 95% and Rs2 may be 98% so that the difference between Rs1 and Rs2 is 3%). In some embodiments, for light (937 or 939) having the second polarization state and incident on the optical film at an incident angle θ, and for at least one wavelength in the predetermined wavelength range, the PBS has average optical reflectance Rp1 and Rp2 for θ about zero and 50 degrees, respectively, and a difference between Rp1 and Rp2 is less than about 0.1%. The difference between Rp1 and Rp2 refers to |Rp1−Rp2| where Rp1 and Rp2 are expressed as percentages (e.g., Rp1 may be 0.25% and Rp2 may be 0.2% so that the difference between Rp1 and Rs2 is 0.05%).

In some embodiments, at least one of light input and output surfaces of the PBS 850 has an anti-reflection coating thereon reducing reflection of normally incident light having the first polarization state to less than about 2%, or 1.5%, or 1%. For example, light input surface 866 may include anti-reflection coating 867 thereon, light output surface 868 may include anti-reflection coating 869 thereon, and/or light output surface 864 may include anti-reflection coating 865 thereon. The anti-reflection coatings can be any suitable anti-reflection coating known in the art, such as interference coatings.

For some PBSs including some optical films, it has been found that when a cone of light having the first polarization state and an f-number between about 1.8 to about 2.2 is incident on the PBS making an incident angle of about 40 to 50 degrees with the optical film at an incident location on the optical film, the PBS can generate a light streak propagating along and between the first and second hypotenuses between the incident location and a diagonal edge of the PBS. For example, when the optical film includes first and second optical stacks separated by a spacer layer having a thickness greater than about 1 micron and the spacer layer does not include dyes or other light absorbing elements or includes too little dye or other light absorbing elements, a light streak can be generated. The light streak can arise from light partially confined between the two prisms due to multiple reflections between the two packets of the optical film. It has been found that including a sufficient level of dyes or other light absorbing elements in the spacer layer can reduce or substantially eliminate the light streak. The intensity of any streak of light depends on the reflectivity of the first and second optical stacks and so the amount of light absorbing elements needed to substantially eliminate the streak of light may be different for different films having optical stacks with different reflectivities.

Figure 22:
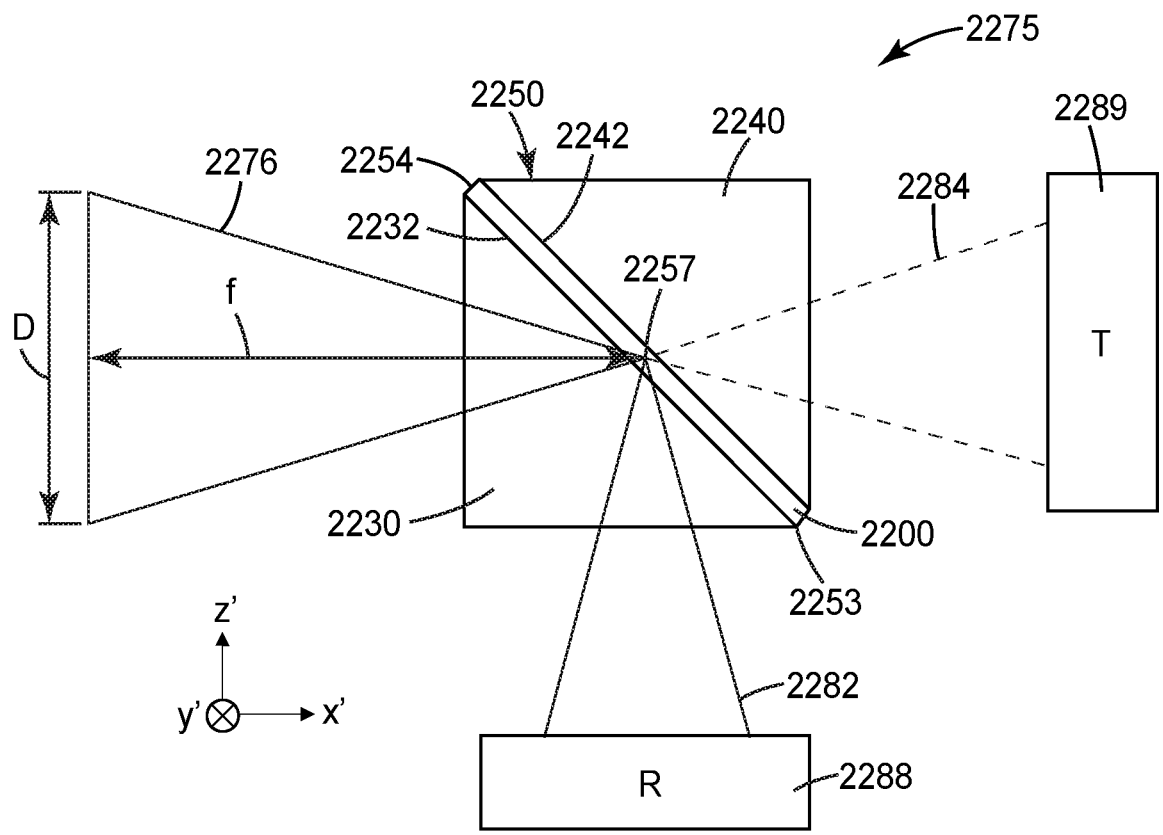
FIG. 22 is a schematic cross-sectional view of an optical system.

FIG. 22 is a schematic illustration of an optical system 2275 including a PBS 2250 which includes a first prism 2230 having a first hypotenuse 2232; a second prism 2240 having a second hypotenuse 2242 facing the first hypotenuse 2232; and an optical film 2200 disposed between and adhered to the first and second hypotenuses 2232 and 2242. The optical system 2275 also includes a detector 2288 to detect light 2282 reflected from the optical film 2200 and a detector 2289 to detect light 2284 transmitted through the optical film 2200. The detector 2288 and/or 2289 may include camera and a screen between the camera and the PBS 2250. As described further elsewhere herein, the optical film 2200 may include first and second optical stacks separated by a spacer layer having a thickness greater than about 1 micron, where each optical stack includes a plurality of alternating higher index and lower index polymeric layers, and where the optical film substantially reflects light having a first polarization state and substantially transmits light having an orthogonal second polarization state in a predetermined wavelength range extending at least from 450 nm to 700 nm. In some embodiments, when a cone of light 2276 having the first polarization state and an f-number (the length f divided by the diameter D) between about 1.8 to about 2.2 is incident on the PBS 2250 making an incident angle (angle between cone axis (e.g., corresponding to optical axis 555 or 855) and a normal to the optical film 2200) of about 40 to 50 degrees with the optical film 2200 at an incident location 2257 on the optical film 2200, the PBS 2250 generates substantially no light streak propagating along and between the first and second hypotenuses 2232 and 2242 between the incident location 2257 and a diagonal edge 2253 or 2254 of the PBS 2250. The diagonal edges 2253 and 2254 are edges of the PBS 2250 along the diagonal defined by the first and second hypotenuses 2232 and 2242.

Figure 23:
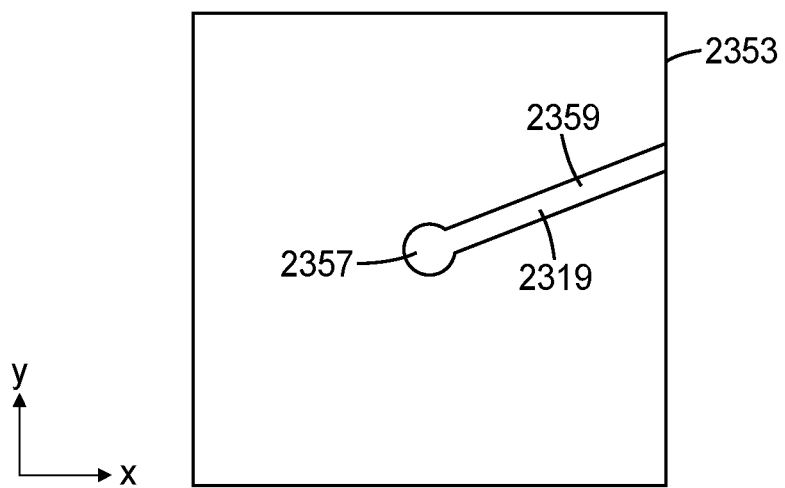
FIG. 23 is a schematic top plan view of an optical film in a polarizing beam splitter.

FIG. 23 is a schematic top plan view of an optical film 2300 in a PBS where the PBS generates a light streak 2359 propagating along and between first and second hypotenuses of the PBS between the incident location 2357 and a diagonal edge 2353 of the PBS. The optical film 2300 may correspond to optical film 2200 but without any light absorbing elements (e.g., light absorbing dye) to attenuate the light streak. When optical film 2300 is used in place of the optical film 2200 in the optical system 2275 and the cone of light 2276 is in the first polarization state (e.g., s-pol) so that the cone of light 2276 is substantially reflected by the optical film 2300, the light streak 2359 is observed at the detector 2289. The direction of the light streak 2359 towards the diagonal edge 2353 depends on the position of the detector 2289 along the y'-axis of FIG. 22. When optical film 2300 is used in place of the optical film 2200 in the optical system 2275 and the cone of light 2276 is in the second polarization state (e.g., p-pol) so that the cone of light 2276 is substantially transmitted through the optical film 2300, the light streak 2359 is observed at the detector 2288. The direction of the light streak 2359 towards the diagonal edge 2353 depends on the position of the detector 2288 along the y'-axis of FIG. 22. In this case, the light streak 2359 may substantially vanish when the detector 2288 is in a plane of symmetry containing the axis of the cone of light 2276 and the axis of the reflected light 2282. In contrast, when the light 2276 is in the first polarization state, the light streak 2359 is present whether or not the detector 2289 is in a plane of symmetry.

It has been found that the light streak 2359 can be eliminated or substantially eliminated by including light absorbing elements (e.g., dye(s) and/or pigment(s)) in a spacer between first and second optical stacks of the optical film. In some embodiments, the loading of light absorbing elements is at least 4 wt %, or at least 5 wt %, or at least 6 wt %. In some embodiments, the loading light absorbing elements is selected such that a sum of Tp and Rp is less than about 98.75% (e.g., less than 98.65% or less than 98.85%), or less than about 98%, or less than about 97.5%, or less than about 97%. In some embodiments, the loading of light absorbing elements is selected such that for normally incident light in the predetermined wavelength range, the optical film has an average optical absorption (unweighted average (mean) over polarization states and over wavelengths in the predetermined wavelength range) of greater than about 1%, or 1.5%, or 2%, or 2.5%.

A PBS may be said to generate substantially no light streak propagating along and between the first and second hypotenuses between the incident location and a diagonal edge 2253 of the PBS, if, when observed in the dark state (e.g., observed in transmission when the cone of light 2276 is in the first polarization state), any such light streak has a luminance so much smaller (e.g., by at least a factor of about 1000) than a luminance at the incident location 2357 that the light streak is near or below the limit of visibility to the unaided human eye. In some embodiments, if any light streak 2359 propagates along and between the first and second hypotenuses between the incident location and a diagonal edge of the PBS when the cone of light is incident on the PBS, a ratio of a luminance of light transmitted through the optical film (e.g., detected by detector 2289 when the cone of light 2276 is substantially reflected toward detector 2288) at the incident location 2357 to a luminance of light transmitted through the optical film (e.g., detected by detector 2289) for a location 2319 in the light streak about halfway between the incident location and the diagonal edge 2353 is greater than about 1000, or 2000, or 4000.

EXAMPLES

Comparative Example A1

Figure 12:
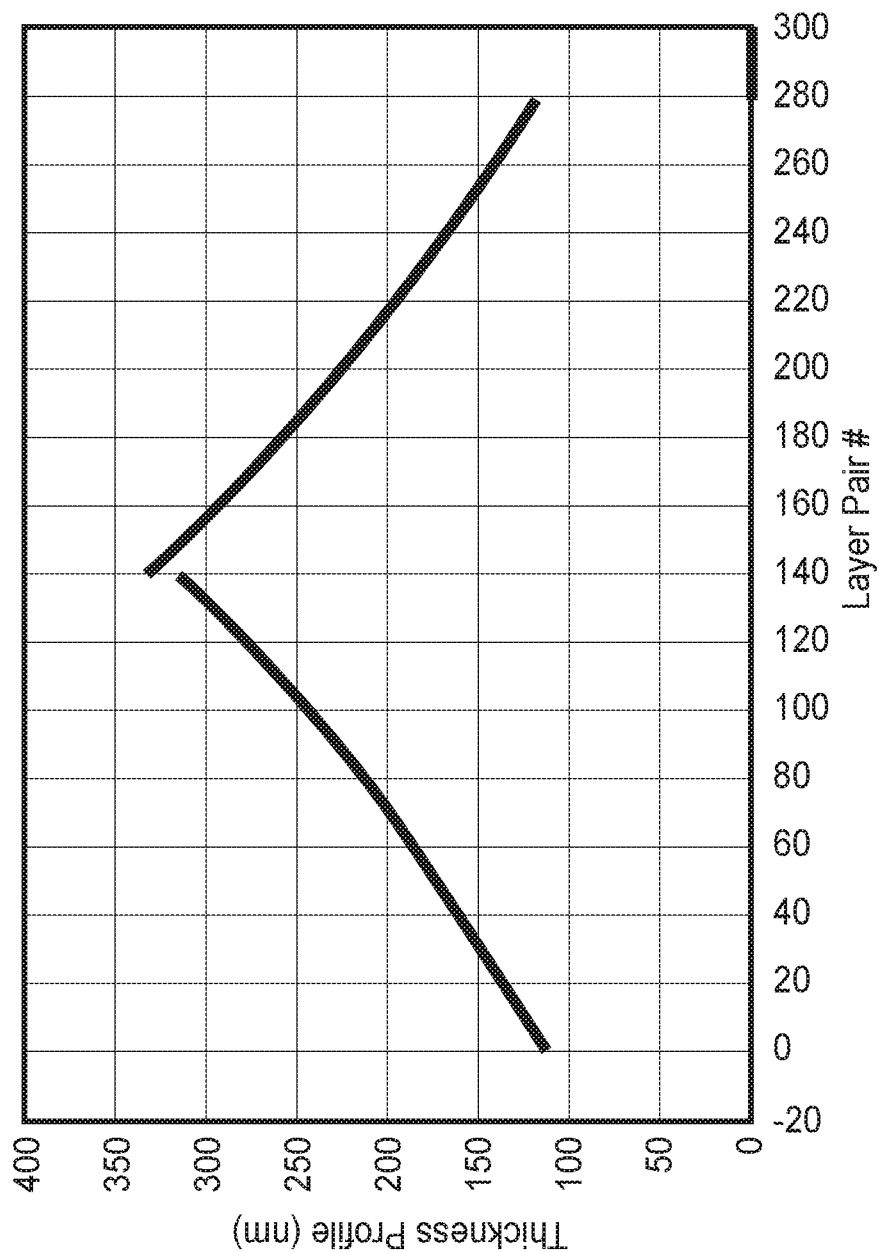
FIG. 12 is a plot of the thickness of sequentially optical repeat units (ORUs) in a reflective polarizer film as a function of the ORU number in the film.

An optical film was made generally as depicted in FIG. 2. The optical film included two packets of optical repeat units (ORUs), where each packet included 138 ORUs. Each ORU included a high index layer of low-melt PEN (a copolymer of 90% PEN and 10% PET and a low index, approximately isotropic layer, consisting of an 85 wt % Polycarbonate/15 wt % PCTg material, blended at 85 wt % with 15 wt % of PETg. The optical film was made by using conventional multilayer optical film processes as described in described in U.S. Pat. Appl. Pub. No. 2007/0047080 (Stover et al). A melt stream having the desired layers was formed and then cast against a casting wheel to form a cast film. The cast film was then uniaxially oriented using a parabolic tenter with a draw ratio of about 6:1 in the transverse direction to provide the optical film. The ORUs were sequentially numbered from 1 to 276 across the optical film. The resulting thickness of the ORUs as a function of the ORU number is shown in FIG. 12. The resulting refractive indices for the high and low index layers are given in Table 1.

TABLE 1

| Wavelength | High Index | | | Low Index |
|---|---|---|---|---|
| (nm) | nx | ny | nz | Isotropic n |
| 633 | 1.832 | 1.571 | 1.563 | 1.569 |
| 550 | 1.857 | 1.582 | 1.574 | 1.579 |
| 430 | 1.953 | 1.628 | 1.620 | 1.620 |

The transmission coefficient for normally incident light in air was measured for the pass and block polarization states and is shown in FIG. 20.

Figure 13:
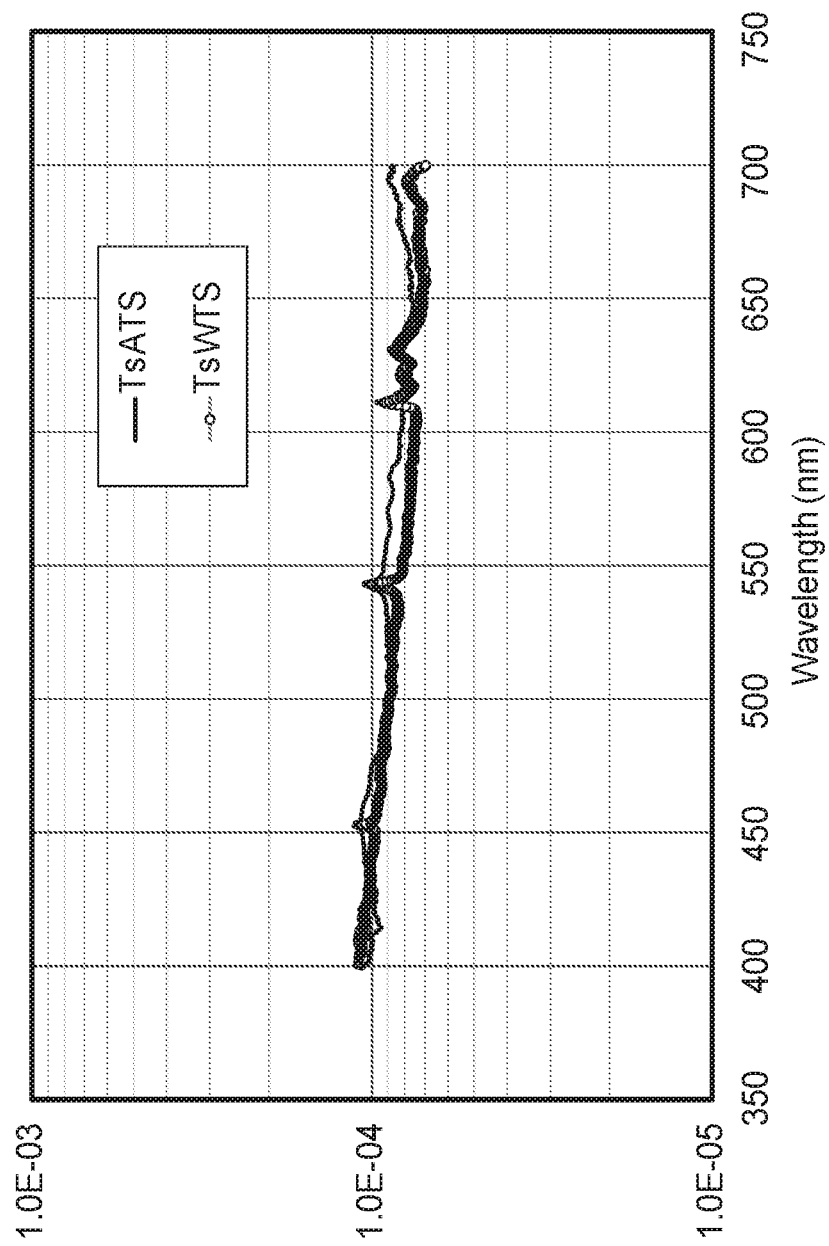
FIG. 13 is a plot of the transmittance of an optical film in a polarizing beam splitter for s-polarized light as a function of wavelength.
Figure 14:
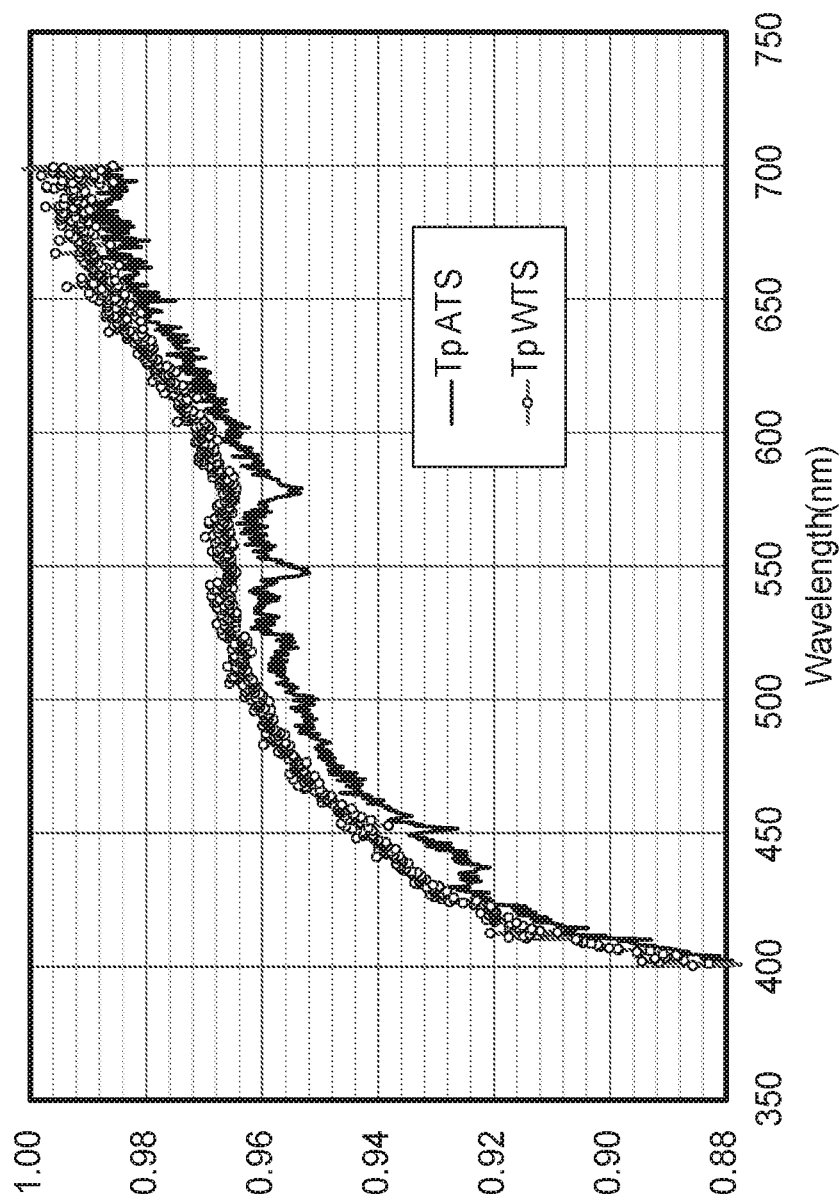
FIG. 14 is a plot of the transmittance of an optical film in a polarizing beam splitter for p-polarized light as a function of wavelength.

A polarizing beam splitter (PBS) was made with the optical film disposed between BK7 glass prisms. The total transmittance as a function of wavelength for light incident on the optical film in the PBS was measured for a collimated light having a specified polarization state and incident on the optical film within the PBS after going through an optical lens having an f-number of 2.04 and centered on an optical axis making an angle of 45 degrees with the optical film. The specified polarization state was either vertically polarized or horizontally polarized and the PBS was positioned so the vertically polarized light was incident on the optical film as s-polarized light, and horizontally polarized light was incident on the optical film as p-polarized light. The pass axis of the optical film was horizontal. The transmittance was determined with the optical film oriented with the wheel side of the film (side that was cast against the casting wheel) towards the light source (denoted WTS) and with the air side of the film (side opposite the wheel side) toward the light source (denoted ATS). FIGS. 13 and 14 show the transmission coefficient (total transmittance) versus wavelength for s-polarized and p-polarized light, respectively, first incident on the optical film from each side of the film.

Comparative Examples C1-C4

Optical films in a PBS were made and measured as in Comparative Example A1. The optical film of Comparative Example C1 included two packets where the second packet was flipped relative to the second packet of Comparative Example A1 so that the ORUs closest to one major surface were thicker layers reflecting red wavelengths and the ORUs closer to the opposite major surface were thinner layers reflecting blue wavelengths. The optical film of C1 included about 750 interference layers. The optical film of Comparative Example C2 had a single packet with layer thickness monotonically varying across the optical film and having 325 interference layers. The optical film of Comparative Example C3 includes two packets with substantially non-overlapping thickness ranges so that one packet reflected shorter wavelengths and the other packet reflected longer wavelengths. The optical film of C3 included about 750 interference layers. The film of Comparative Example C4 was similar to that of Comparative Example C2 except the total number of interference layers was 275 and a larger refractive index difference was used to obtain a similar reflectivity.

For each of Comparative Examples C1-C4, the materials and processes used for manufacturing these films were generally as described for Comparative Example A1 except for the total number of interference layers, and their configurations, as described above.

Figure 15:
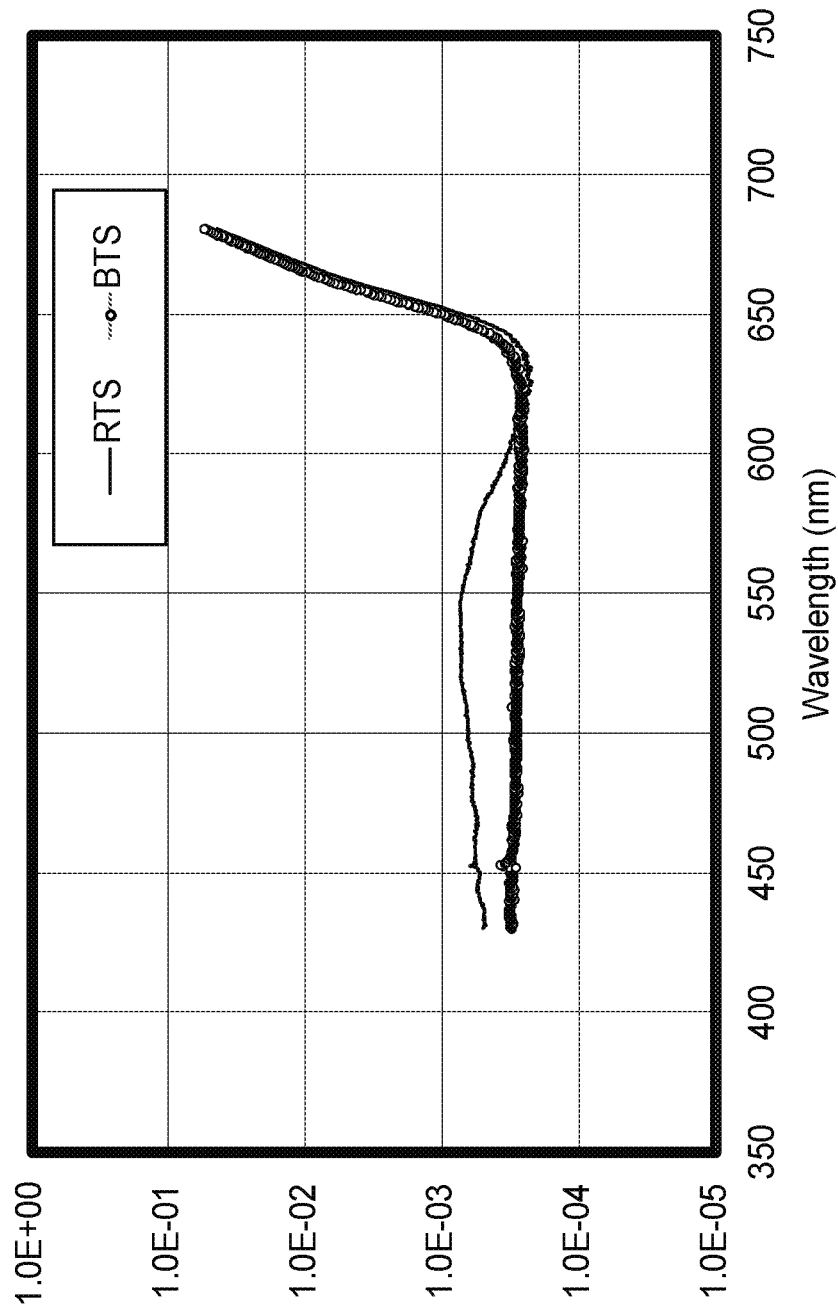
FIG. 15-18 are plots of the transmittance of optical films in polarizing beam splitters for s-polarized light as a function of wavelength.
Figure 16:
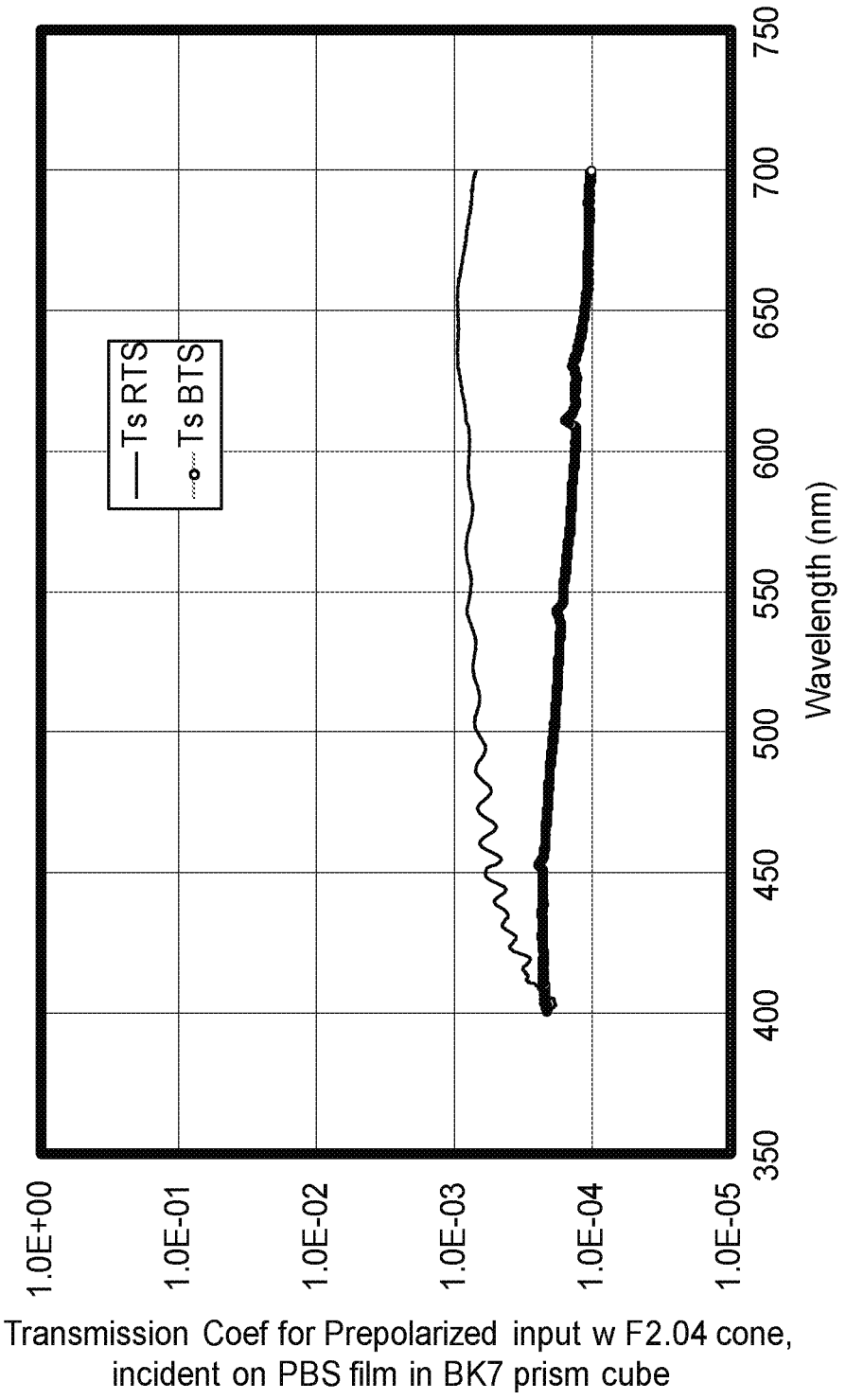
Figure 17:
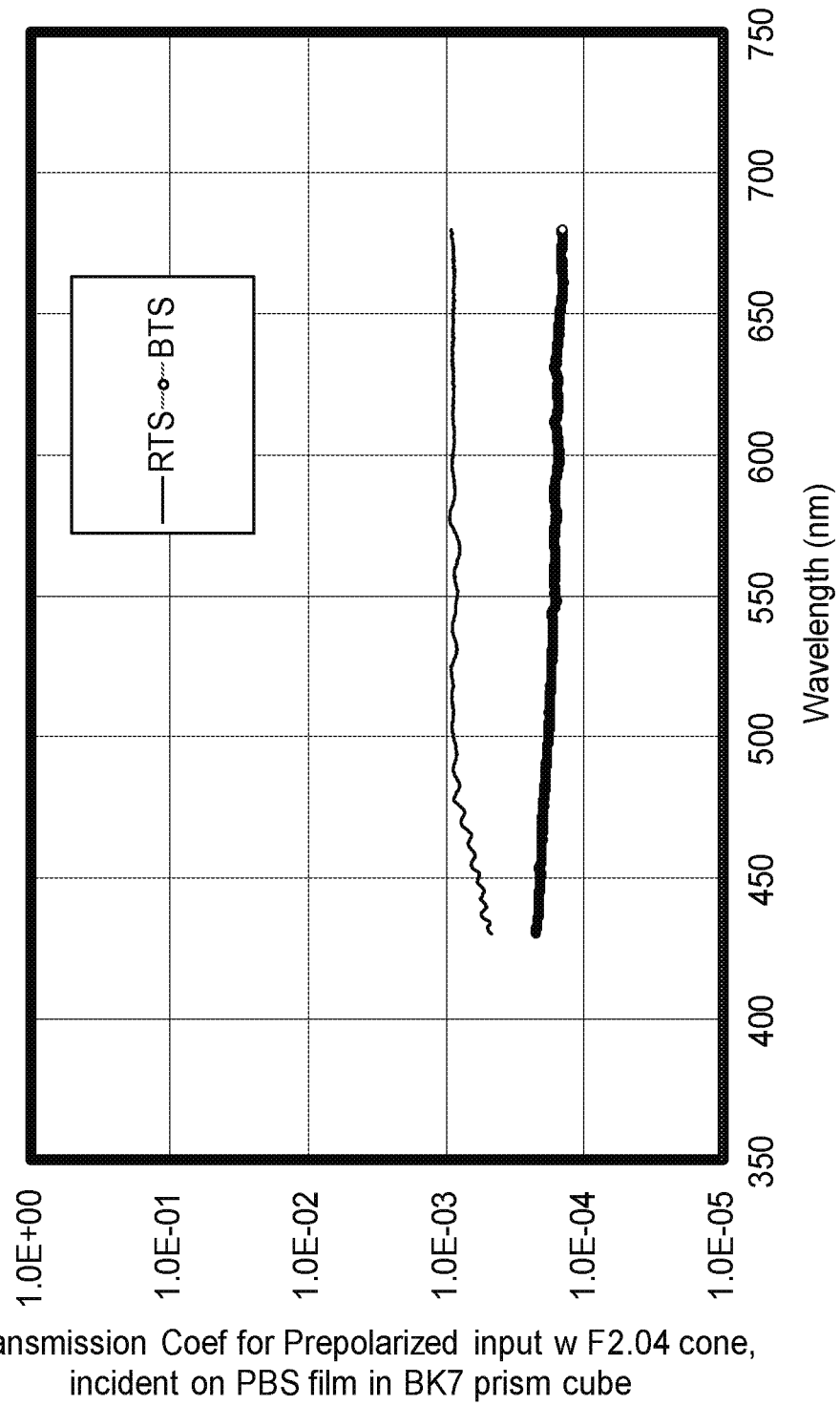

FIGS. 15-17 show the total transmittance for s-polarized light first incident on each side of the optical films of Comparative Examples C1-C3, respectively, in a BK7 prism cube determined for a collimated light having an s-polarization state and incident on the optical film within the PBS after going through an optical lens having an f-number of 2.04 and centered on an optical axis making an angle of 45 degrees with the optical film. RTS and BTS denote that the side of the optical film with layers reflecting in the red was facing the light source or that the side of the optical film with layers reflecting in the blue was facing the light source, respectively.

Comparative Example A2

An optical film was made and as in Comparative Example A1 except that a center spacer layer between the two packets of ORUs included a combination of 4 different polarizing dichroic dyes listed in Table 2.

TABLE 2

| PD-335H (Yellow) | Dichroic dye | Mitsui Fine Chemical, Japan |
| PD-104 (Red) | Dichroic dye | Mitsui Fine Chemical, Japan |
| PD-325H (Blue) | Dichroic dye | Mitsui Fine Chemical, Japan |
| PD-318H (Cyan) | Dichroic dye | Mitsui Fine Chemical, Japan |

The dichroic dyes for Comparative Example A2, were added to the center spacer layer between the two packets of ORUs, in the combination as shown in Table 3 where the dichroic dyes were master-batched in PEN resin at the indicated pounds per hour (pph). The total concentration of the dichroic dyes used in Film 2 was about 3.1 weight percent.

TABLE 3

| Yellow pph | Red pph | Blue pph | Cyan pph | LmPEN/PEN pph |
|---|---|---|---|---|
| 0.19 | 0.36 | 0.73 | 0.90 | 67.84 |

The transmission coefficient for normally incident light in air was measured for the pass and block polarization states and is shown in FIG. 21.

Figure 18:
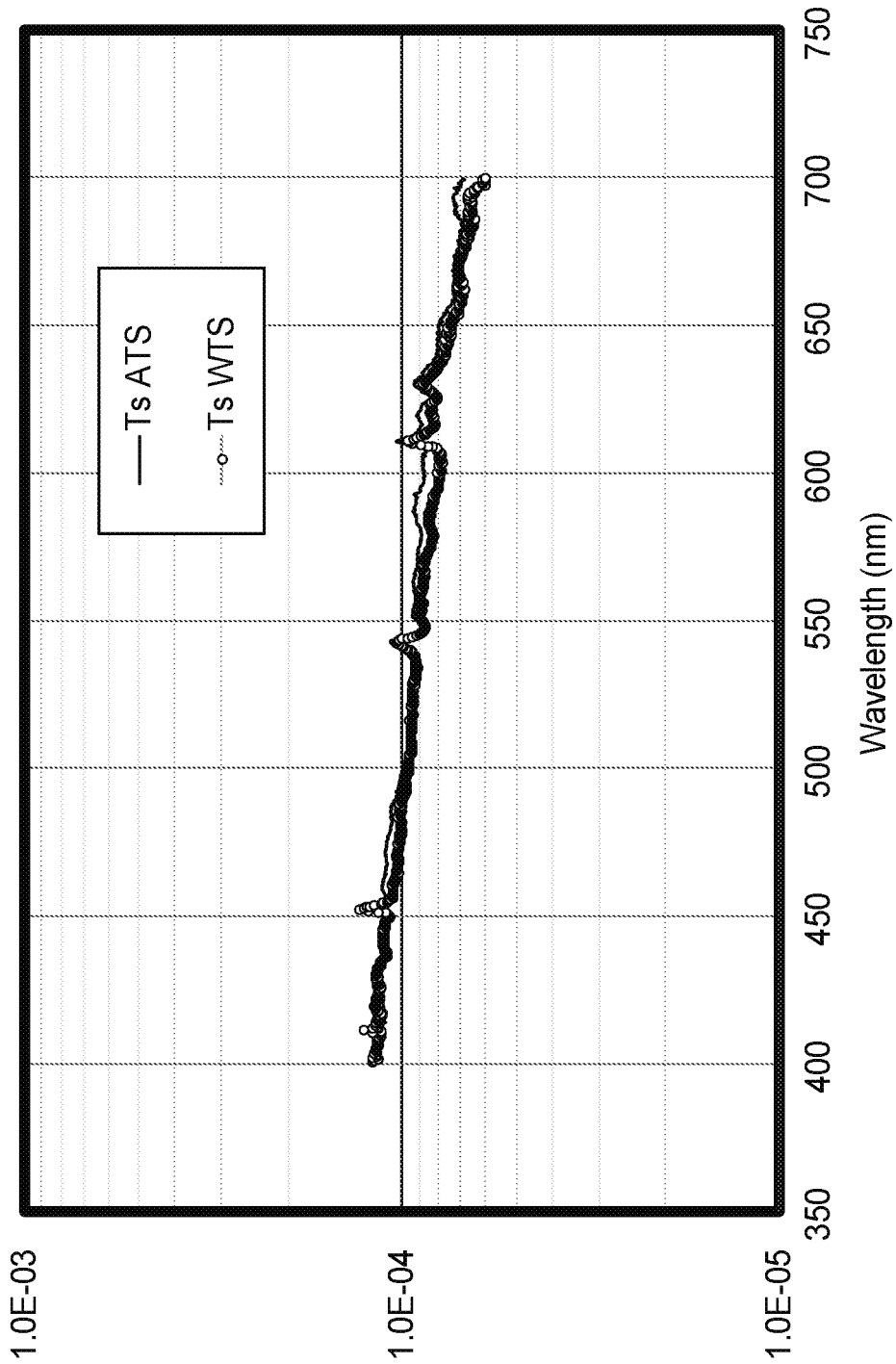
Figure 19:
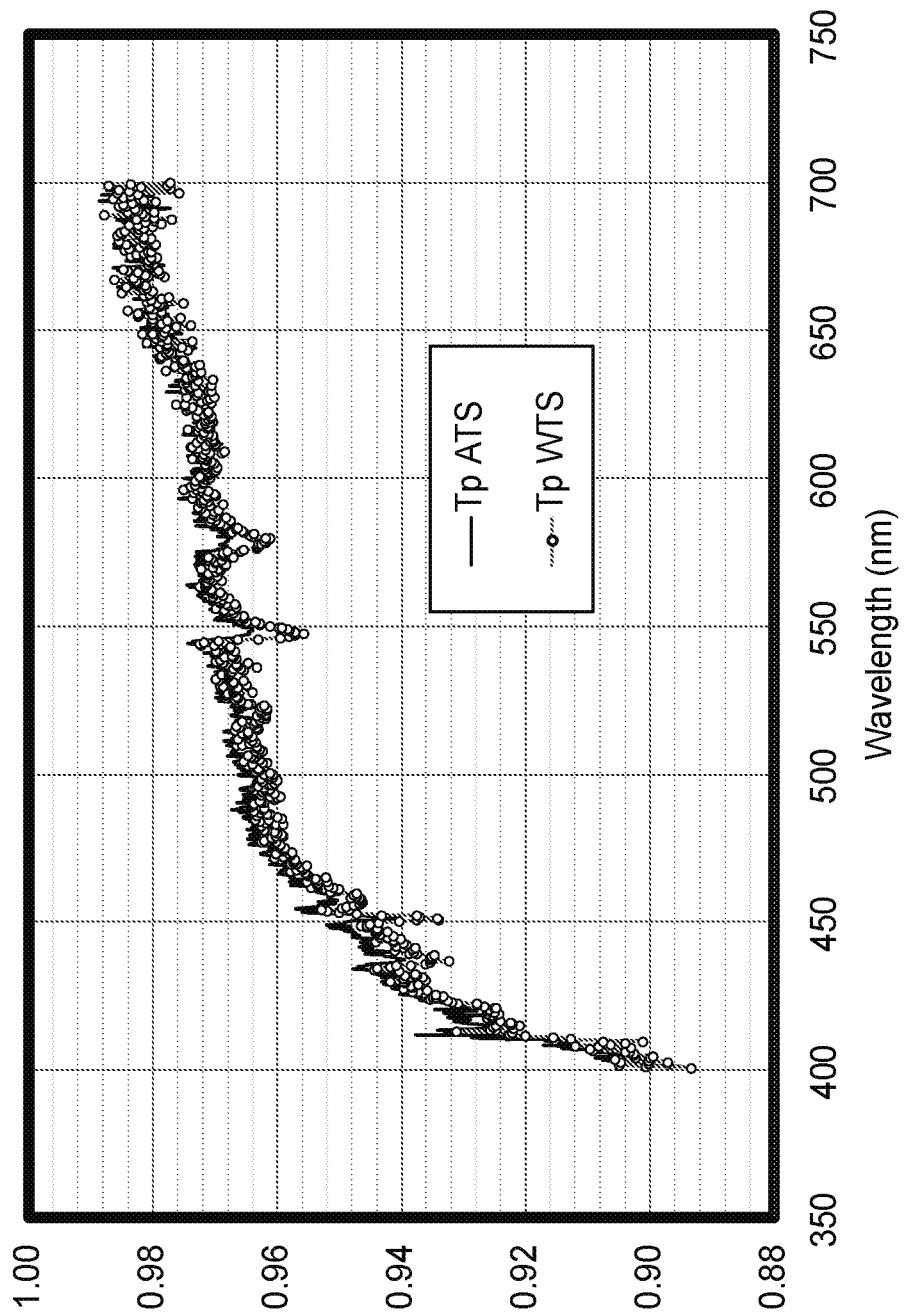
FIG. 19 is a plot of the transmittance of an optical film in a polarizing beam splitter for p-polarized light as a function of wavelength.

The film was tested in a PBS as in Comparative Example A1. FIGS. 18 and 19 show the transmission coefficient (total transmittance) versus wavelength for s-polarized and p-polarized light, respectively, first incident on the optical film from each side of the film of Comparative Example A2.

Examples 1-3

An optical film made as described for Comparative Example A2 except that the spacer later was blended according to Table 4. The total concentrations of the dichroic dyes were about 6.2, 12.4, and 18.6 weight percent, respectively, for Examples 1-3.

TABLE 4

| Ex. | Yellow pph | Red pph | Blue pph | Cyan pph | LmPEN/PEN pph |
|---|---|---|---|---|---|
| 1 | 0.37 | 0.71 | 1.46 | 1.79 | 65.67 |
| 2 | 0.74 | 1.42 | 2.92 | 3.58 | 61.34 |
| 3 | 1.11 | 2.13 | 4.38 | 5.37 | 57.01 |

The transmission coefficients for normally incident light for Examples 1-3 showed suppression of visible light transmission compared to that shown in FIGS. 20-21 due to the increased dye loading. The average optical absorption in the wavelength range of 450 nm to 700 nm for normally incident light on the optical film in the pass state was estimated from transmittance spectra which was determined by both optical modeling and by measurement. The modeling results, which are provided in Table 5, were in good agreement with the measured results. The average optical absorption in the wavelength range of 450 nm to 700 nm for the pass and block states for normally incident light incident on the spacer layer was estimated from transmittance spectra which was determined by optical modeling. The results are provided in Table 5.

TABLE 5

| Ex. | Pass State Absorption of Film | Pass State Absorption of Spacer | Block State Absorption of Spacer |
| --- | --- | --- | --- |
| A2 | 1.5% | 1.5% | 13% |
| 1 | 3% | 3% | 23% |
| 2 | 5% | 5% | 36% |
| 3 | 7% | 7% | 46% |

The optical films of Example 1 and of Comparative Examples A1 and A2 were tested in an optical system similar to the optical system 2275 schematically illustrated in FIG. 22. PBS cubes about 1 inch wide were made with the optical film disposed between and adhered to hypotenuses of first and second prisms. The cone of light 2276 was a cone of white light having an s-polarization state and having an f-number of about 2. For Comparative Example A1, a light streak as schematically illustrated in FIG. 23 was observed at the detector 2289. For Comparative Example A2, the luminance in the light streak was diminished compared to Comparative Example A1, but the light streak was readily visible to the unaided eye. For Example 1, no light streak was readily visible to the unaided eye and therefore substantially no light streak was generated. However, a luminance distribution corresponding to a light streak was detected by the detector 2289 as described further below.

The cone of light 2276 was generated as follows. Light was generated by a mercury UHP (ultra-high performance) lamp and focused down on a field stop by an elliptical reflector. A lens was placed a focal length away from the field stop to collimate the light. The illumination f-number was controlled by an aperture stop placed a focal length away from the first lens. A second lens was placed a focal length away from the aperture stop. The focus of the light beam was one focal length away from the second lens. The PBS under test was placed approximately at this focus. After leaving the second lens, the light passed through a polarizer oriented to minimize the light passing through the PBS. Between the polarizer and a PBS, an additional stop was provided by an iris that was set so that the intended light would pass unimpeded while reducing scattered light that may have entered the PBS from the illumination system. A camera (corresponding to detector 2289) was placed so that it was off the optical axis on the side to which the light was reflected (negative z' direction in FIG. 22). However, the camera lens was still within the cone of light that leaked through the PBS.

Positioned in this manner, the camera could see a striking light streak between the illuminated spot and the corner of the PBS when the dual-stack PBS had no dye between the optical stacks (Comparative Example A1). High dynamic range (HDR) photographs were taken of this streak with the camera positioned slightly above the principal plane (e.g., slightly above (y'>0) the y'=0 plane of FIG. 22). When photographed using a linear gray scale, the film of Comparative Example A1 resulted a small dot corresponding to the incident location of the cone of light and a light streak extending from the dot to a diagonal edge of the PBS, similar to the schematic illustration of FIG. 23. When photographed using a logarithmic gray scale, the film of Comparative Example A1 resulted a small dot corresponding to the incident location with a large halo of dimmer light around the dot and with a brighter light streak extending from the dot to a diagonal edge of the PBS. When photographed using a linear gray scale, the film of Example 1 resulted a small dot corresponding to the incident location of the cone of light and substantially no light streak, though a luminance distribution corresponding to a light streak was detected by the camera. When photographed using a logarithmic gray scale, the film of Comparative Example A1 resulted a small dot corresponding to the incident location with a large halo of dimmer light around the dot and substantially no light streak, though a luminance distribution corresponding to a light streak was detected by the camera. In each case, a bright spot at the edge was observed.

Figure 25:
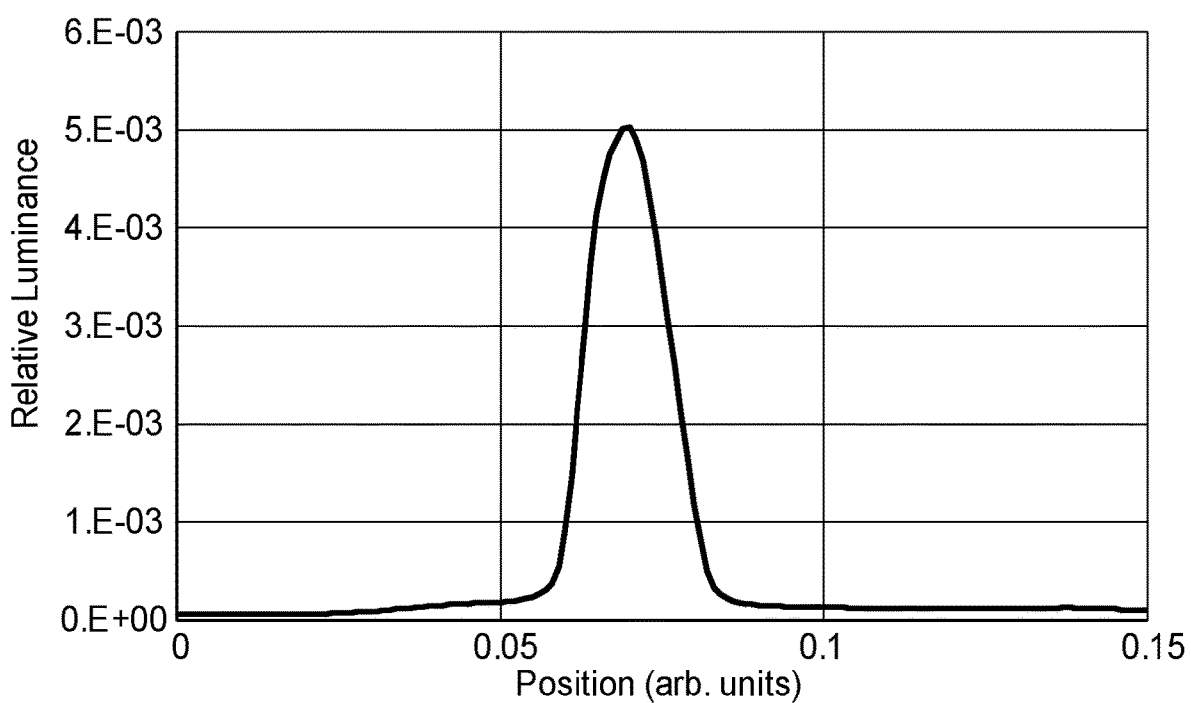
FIGS. 25-26 are plots of relative luminance across the widths of light streaks.
Figure 26:
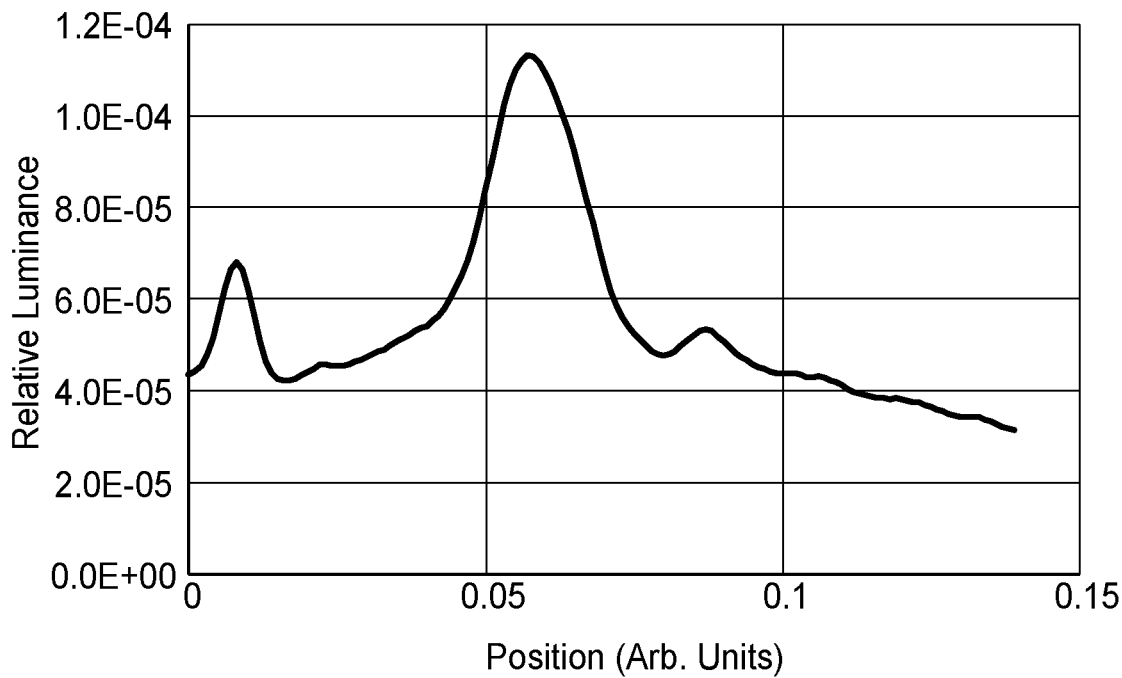
Figure 27:
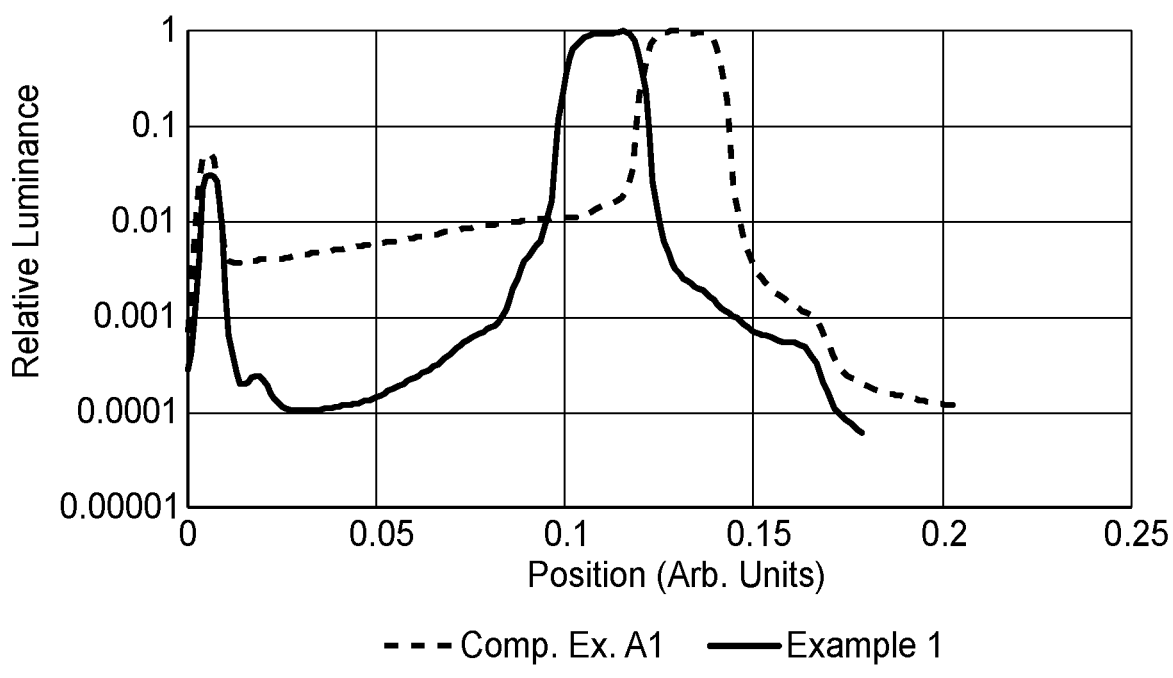
FIG. 27 is a plot of relative luminance along the lengths of light streaks.

The camera was a Radiant Vision Systems (RVS) I29 imaging colorimeter, model IC-PMI29-XB using an RVS ARVR lens (available from Radiant Vision Systems, Redmond, WA). RVS TrueTest image analysis software was utilized to analyze the resulting images. Luminance distributions were determined in cross-sections along the lengths and widths of the light streaks. Measurements were averaged over a 5×5 pixel area across each cross-section. The relative luminance (luminance normalized so that the maximum relative luminance, which was located at the small dot, was unity) along the width at a location between the incident location and the edge is shown in FIGS. 25-26 for Comparative Example A1 and Example 1, respectively. For Comparative Example A1, the luminance in the light streak was at least about 40 times greater than the luminance away from the light streak, while for Example 1, the luminance corresponding to the light streak was no more than about 3 times the luminance at positions away from positions corresponding to the light streak. The luminance at positions along the length of the light streak between the dot and the diagonal edge, at a central location along the width, is shown in FIG. 27 for Comparative Example A1 and for Example 1. For Comparative Example A1, a ratio of a luminance of light transmitted through the optical film at the incident location to a luminance of light transmitted through the optical film at a location in the light streak about halfway between the incident location and the diagonal edge was about 135. For Example 1, a ratio of a luminance of light transmitted through the optical film at the incident location to a luminance of light transmitted through the optical film at a location in the light streak about halfway between the incident location and the diagonal edge was about 5000.

Terms such as "about" and "substantially" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 5 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.95 and 1.05, and that the value could be 1. If the use of "substantially normal" is not otherwise clear to one of ordinary skill in the art in the context in which it is used and described in the present description, "substantially normal" will mean within 30 degrees of normal. Directions described as substantially normal may, in some embodiments, be within 20 degrees, or within 10 degrees of normal, or may be normal or nominally normal.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising a first optical stack disposed on, and spaced apart by one or more spacer layers from, a second optical stack, each optical stack comprising a plurality of polymeric interference layers reflecting and transmitting light primarily by optical interference in a same predetermined wavelength range extending at least from 450 to 700 nm, for light in the predetermined wavelength range and substantially normally incident on the optical film, the plurality of the interference layers in each optical stack reflecting at least 80% of light having a first polarization state and transmitting at least 80% of light having an orthogonal second polarization state;

such that when the optical film is disposed between, and adhered to, hypotenuses of first and second prisms to form a polarizing beam splitter (PBS), and a cone of light having at least one wavelength in the predetermined wavelength range and an f-number from about 1.8 to about 2.2 is incident on the PBS making an incident angle of about 40 to 50 degrees with the optical film, the PBS has:

an average optical reflectance Rs greater than about 95% for the first polarization state;

an average optical transmittance Ts less than about 0.012% for the first polarization state;

an average optical transmittance Tp less than about 98.5% for the second polarization state; and an average optical reflectance Rp less than about 0.25% for the second polarization state, Tp/Ts greater than about 8000, wherein the first and second optical stacks and the one or more spacer layers are formed integrally with one another.

2. The optical film of claim 1, wherein the same predetermined wavelength range extends at least from 400 to 700 nm.

3. The optical film of claim 1, wherein the same predetermined wavelength range extends at least from 400 to 980 nm.

4. The optical film of claim 1, wherein the cone of light comprises wavelengths in a range extending at least from 480 to 600 nm.

5. The optical film of claim 1, wherein the cone of light comprises white light.

6. The optical film of claim 1, wherein Tp is greater than about 90%.

7. The optical film of claim 1, wherein for light having the first polarization state and incident on the optical film at an incident angle θ, and for at least one wavelength in the predetermined wavelength range, the PBS has average optical reflectance Rs1 and Rs2 for θ about zero and 50 degrees, respectively, a difference between Rs1 and Rs2 less than about 5%.

8. The optical film of claim 1, wherein thickest polymeric interference layers of the first and second optical stacks are disposed between thinnest polymeric interference layers of the first and second optical stacks.

9. The optical film of claim 1, wherein a thickest polymeric interference layer of the second optical stack is thicker than a thickest polymeric interference layer of the first optical stack.

* * * * *